(12) United States Patent
Sugiura et al.

(10) Patent No.: US 8,311,777 B2
(45) Date of Patent: Nov. 13, 2012

(54) COKE OVEN WALL SURFACE EVALUATION APPARATUS, COKE OVEN WALL SURFACE REPAIR SUPPORTING APPARATUS, COKE OVEN WALL SURFACE EVALUATION METHOD, COKE OVEN WALL SURFACE REPAIR SUPPORTING METHOD AND COMPUTER PROGRAM

(75) Inventors: Masato Sugiura, Tokyo (JP); Michitaka Sakaida, Tokyo (JP); Koichi Fukuda, Tokyo (JP); Tomoyuki Nakagawa, Tokyo (JP); Akihide Sano, Tokyo (JP); Yoshifumi Morizane, Tokyo (JP); Keisuke Irie, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 541 days.

(21) Appl. No.: 12/448,834

(22) PCT Filed: Feb. 19, 2008

(86) PCT No.: PCT/JP2008/052748
§ 371 (c)(1), (2), (4) Date: Jul. 9, 2009

(87) PCT Pub. No.: WO2008/105269
PCT Pub. Date: Sep. 4, 2008

(65) Prior Publication Data
US 2010/0095752 A1 Apr. 22, 2010

(30) Foreign Application Priority Data

Feb. 22, 2007 (JP) ................................. 2007-042460
Mar. 29, 2007 (JP) ................................. 2007-089437

(51) Int. Cl.
*G01B 11/30* (2006.01)
*G06F 17/40* (2006.01)
*G06F 19/00* (2006.01)

(52) U.S. Cl. ............. 702/187; 72/104; 72/865.8; 356/2; 356/237.2; 356/600; 356/601; 382/108; 702/35; 702/166; 702/189; 708/200

(58) Field of Classification Search .................. 73/104, 73/432.1, 865.8, 865.9; 340/500, 540, 679; 356/2, 72, 237.1, 237.2, 600, 601, 625; 382/100, 382/108; 700/90, 213; 702/1, 33, 34, 35, 702/40, 127, 155, 166, 167, 170, 182, 187, 702/189; 708/100, 105, 131, 160, 200
See application file for complete search history.

(56) References Cited

U.S. PATENT DOCUMENTS
4,017,188 A * 4/1977 Sawatari ....................... 356/600
(Continued)

FOREIGN PATENT DOCUMENTS
CN 1703485 11/2005
(Continued)

OTHER PUBLICATIONS
International Search Report dated Jun. 3, 2008 issued in corresponding PCT Application No. PCT/JP2008/052748.
(Continued)

*Primary Examiner* — Edward Cosimano
(74) *Attorney, Agent, or Firm* — Kenyon & Kenyon LLP

(57) ABSTRACT

An oven wall three-dimensional profile data (701) representing concave and convex amounts on all over oven walls (14R, 14L) at a right side and left side of a coking chamber (11) is generated by using image signals obtained by a wall surface observation apparatus (200). A resistance index "k" in which a resistance received by pushed coke (15) resulting from a rising gradient existing on the oven wall (14) is indexed is asked by using the oven wall three-dimensional profile data (701). It can be verified that there is a correlation between this resistance index "k" and a pushing load. Accordingly, it is possible to quantitatively evaluate a state of the oven wall (14) affecting on the pushing load.

38 Claims, 28 Drawing Sheets

U.S. PATENT DOCUMENTS

| | | | |
|---|---|---|---|
| 4,650,330 A * | 3/1987 | Fujita | 356/489 |
| 6,222,628 B1 * | 4/2001 | Corallo et al. | 356/601 |
| 6,323,952 B1 * | 11/2001 | Yomoto et al. | 356/600 |
| 6,849,321 B2 * | 2/2005 | Abbott et al. | 428/141 |
| 7,400,414 B2 * | 7/2008 | Tobiason et al. | 356/607 |
| 2004/0091620 A1 * | 5/2004 | Abbott et al. | 427/250 |
| 2007/0097381 A1 * | 5/2007 | Tobiason et al. | 356/604 |

FOREIGN PATENT DOCUMENTS

| | | |
|---|---|---|
| EP | 1167919 | 1/2002 |
| EP | 1340799 | 9/2003 |
| EP | 2113552 A1 * | 11/2009 |
| JP | 2-74816 A * | 3/1990 |
| JP | 11-256166 | 9/1999 |
| JP | 2002-080852 | 3/2002 |
| JP | 2002-121556 | 4/2002 |
| JP | 2003-183661 | 7/2003 |
| JP | 2005-036021 | 2/2005 |
| JP | 2005-249698 A * | 9/2005 |
| JP | 2008-201993 A * | 9/2008 |
| JP | 2008-303239 A * | 12/2008 |
| JP | 2009-167226 A * | 7/2009 |
| JP | 2009-209290 A * | 9/2009 |
| TW | 544463 | 8/2003 |
| WO | WO 00/55575 A1 * | 9/2000 |

OTHER PUBLICATIONS

International Preliminary Report on Patentability dated Nov. 19, 2009 issued in corresponding PCT Application No. PCT/JP2008/052748.

Taiwanese Office Action, dated Dec. 30, 2011, issued in corresponding Taiwanese application No. 971065102.

* cited by examiner

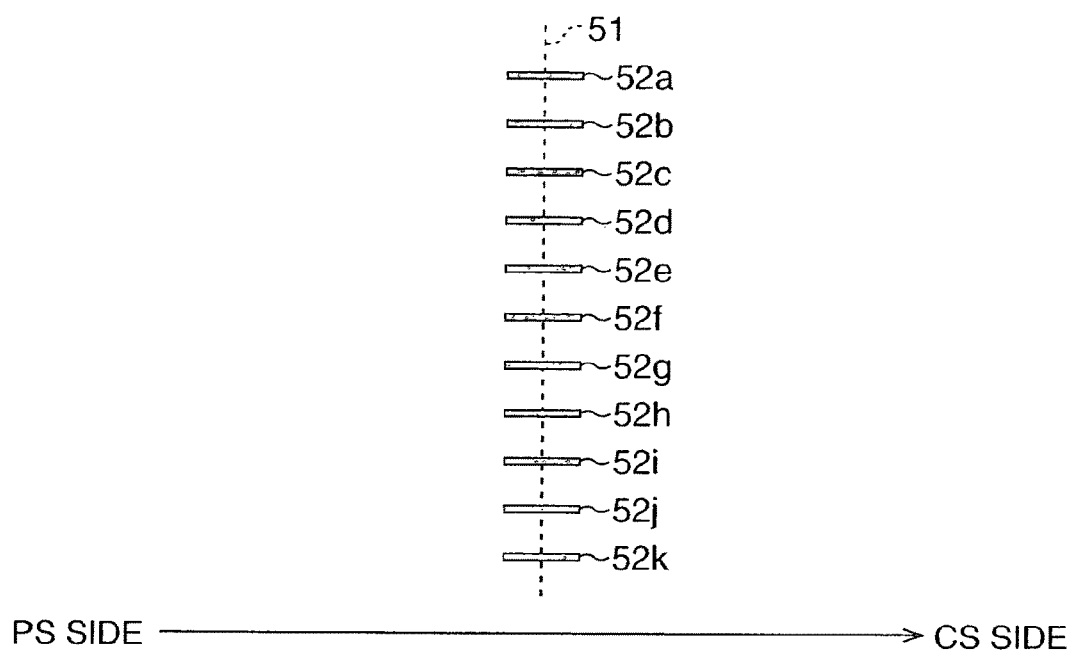

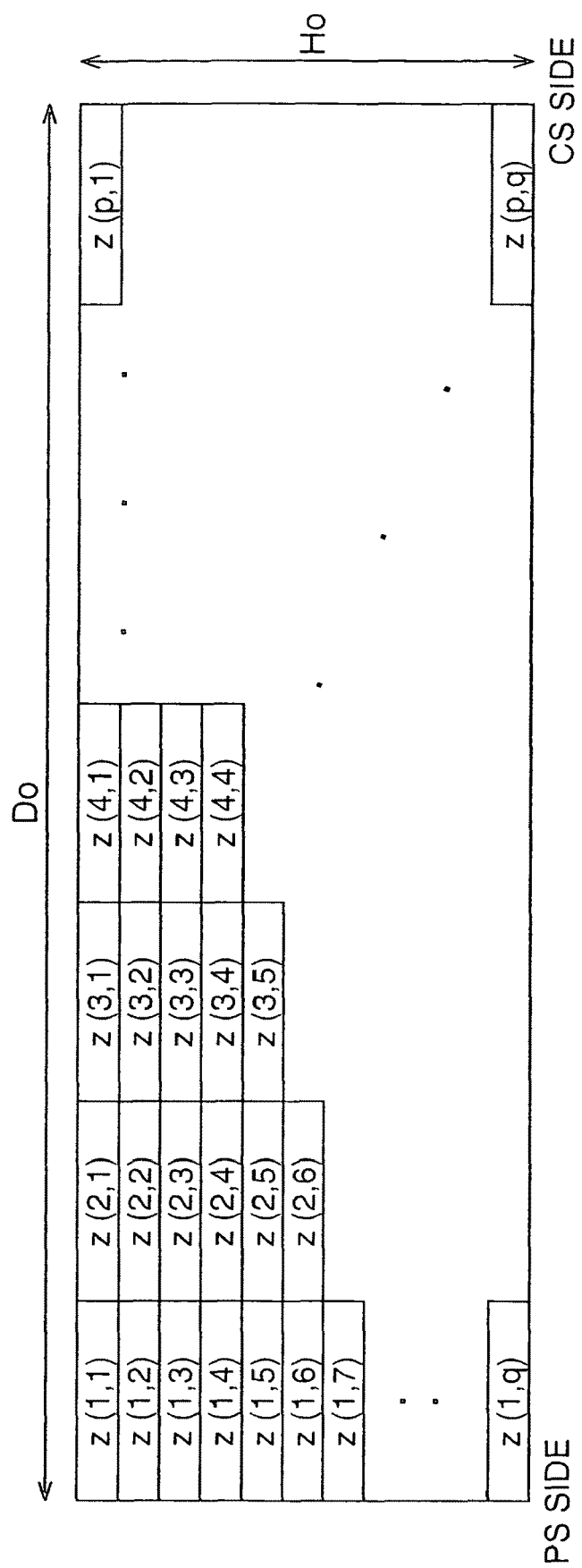

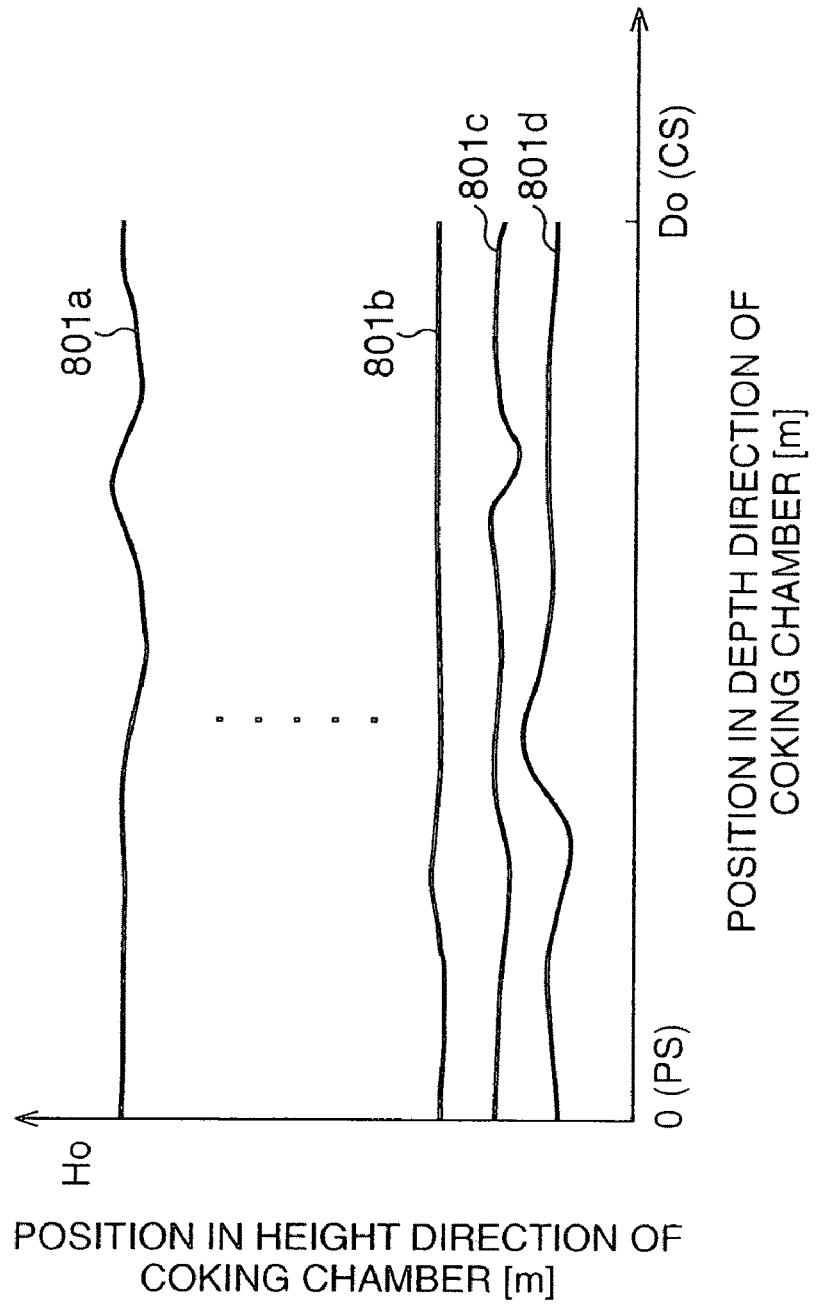

PS SIDE →  CS SIDE

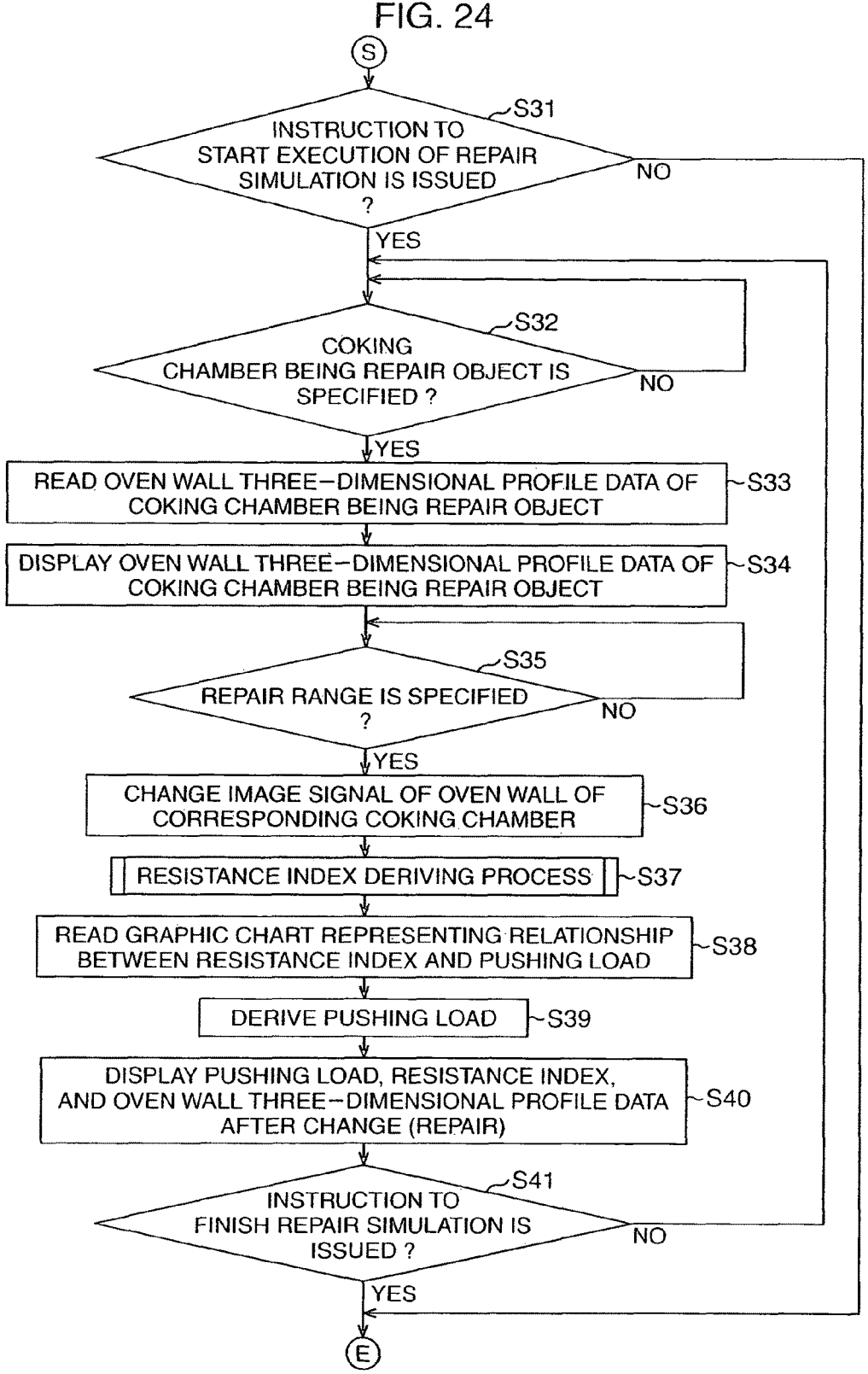

__(1)__

COKE OVEN WALL SURFACE EVALUATION APPARATUS, COKE OVEN WALL SURFACE REPAIR SUPPORTING APPARATUS, COKE OVEN WALL SURFACE EVALUATION METHOD, COKE OVEN WALL SURFACE REPAIR SUPPORTING METHOD AND COMPUTER PROGRAM

This application is a national stage application of International Application No. PCT/JP2008/052748, filed Feb. 19, 2008, which claims priority to Japanese Application Nos. 2007-042460, filed Feb. 22, 2007; and 2007-089437, filed Mar. 29, 2007, each of which is incorporated by reference in its entirety.

TECHNICAL FIELD

The present embodiment relates to a coke oven wall surface evaluation apparatus, a coke oven wall surface repair supporting apparatus, a coke oven wall surface evaluation method, a coke oven wall surface repair supporting method, and a computer program. In particular, they are suitable for use to evaluate a state of a wall surface of a coking chamber of a coke oven, or to issue a guideline to repair the wall surface of the coking chamber of the coke oven.

BACKGROUND ART

A coke oven generating coke by coking coal is constituted by alternately disposing a lot of coking chambers and combustion chambers via oven walls formed by firebricks and so on. When the coke is generated by the coke oven as stated above, at first, the coal is charged from a coal charging hole at a top portion of the coking chamber. Next, a high temperature at 1000° C. or more is applied to the coal inside the coking chamber for approximately 20 hours by heat generated at the combustion chamber by burning gas. The coal is thereby coked (carbonized), and coke cake (hereinafter, referred to as just "coke") is produced. When the coke is produced, doors disposed at both ends of the coking chamber are opened, the coke is pushed by a pusher from a lateral side of the coking chamber, and the coke is taken out of the coking chamber. The coking chamber to produce the coke as stated above has a size of, for example, approximately 16 m in length, 6 m in height, and 0.4 m in width, and it is a characteristic that the coking chamber has a structure in which the width thereof is narrow compared to the length and the height.

There is a case when damages occur on the oven wall of the coking chamber in the coke oven continuously operating for a long time. Accordingly, it is extremely important to grasp a state of the oven wall of the coking chamber, from a point of view of preventing deterioration of producing capacity of the coke resulting from an interruption, a delay, and so on of an operation caused by the damage of the coking chamber (hereinafter, the oven wall of the coking chamber is abbreviated to the oven wall according to need).

There is an art disclosed in Patent Document 1 as a conventional art diagnosing a state of the oven wall. In the art, at first, a distance between the oven walls is measured at a certain height of the coking chamber, and an actual measurement distance displacement line representing a relationship between a distance in a depth direction of the coking chamber and the distance between the oven walls is asked from the measured result, and further, a smoothed displacement line in which the asked actual measurement distance displacement line is smoothed is asked. A total sum of areas of a part surrounded by these actual measurement distance displacement line and the smoothed displacement line is asked, and the state of the oven wall is diagnosed from the asked area.

Incidentally, it is desirable that a pushing load generated when the coke is pushed is small to operate the coke oven. A clogging of coke occurs when the pushing load becomes a certain value or more, and the producing capacity of the coke deteriorates significantly. There are various factors determining the pushing load as stated above. Specifically, various factors such as concaves and convexes of the oven wall, a proof stress of the oven wall, a space amount between the oven wall and the coke, a size of each coke block constituting the coke, a charging amount of the coke in the coking chamber, a frictional force between the oven wall and the coke generated at a pushing time, a moisture amount contained in a composition of coal and the coal, and a coking state of the coal and so on are intricately intertwined, and thereby, the pushing load is generated.

It is possible to manage the operation of the coke oven more appropriately than before if an influence of the concaves and convexes of the oven wall exerted on the pushing load can be quantitatively grasped, because it is possible to grasp whether the pushing load increases caused by the concaves and convexes of the oven wall, or by factors other than the concaves and convexes of the oven wall.

However, the factors determining the pushing load are complicated as stated above. Accordingly, it is conventionally impossible to quantitatively grasp the relationship between the pushing load and the concaves and convexes of the oven wall. The state of the oven wall can only be grasped objectively for some extent by the art described in the above-stated Patent Document 1, and it is impossible to quantitatively bring the pushing load into correspondence with the state of the concave and convex of the oven wall.

Besides, many of existing coke ovens have been operating for a long period of time of 30 years or more, and therefore, there are cases when caves are generated or projections resulting from an adhesion of carbon are generated at a portion or plural portions of an oven wall surface of the coking chamber, because firebricks constituting the oven wall of the coking chamber deteriorate resulting from thermal, chemical, or mechanical factors.

A producing capacity of coke may deteriorate drastically if the clogging of the coke occurs caused by the increase of the pushing load of the coke as stated above. Accordingly, it is necessary to repair the oven wall surface of the coking chamber to recover a flatness of the oven wall surface of the coking chamber, when there are concaves and convexes on the oven wall surface of the coking chamber.

However, the operation of the coking chamber has to be stopped when the repair of the oven wall of the coking chamber is performed, because the coke oven is operating continuously. Flame gunning is performed for the repair of the oven wall of the coking chamber, but several hours (for example, three hours) are necessary per a part to perform the flame gunning work. Accordingly, it is impossible to repair all of the concaves and convexes thoughtlessly because a time allowed for performing the flame gunning work is limited from a point of view of productivity.

Accordingly, it is necessary to repair the concaves and convexes generated on the oven wall of the coking chamber effectively and appropriately. An art determining a repair order of the oven wall of the coking chamber is proposed conventionally (refer to Patent Document 2). In the art described in the Patent Document 2, a degree of damages of the oven wall of the coking chamber is digitized from a size of a damaged region obtained by an image of the oven wall of the coking chamber, and a priority of the repair is determined based on the digitized information.

As stated above, the repair of the oven wall is desirable to be performed to the extent that the clogging of the coke does not occur. The clogging of the coke oven occurs when the pushing load of the coke becomes large. Accordingly, it becomes possible to effectively perform the repair of the oven wall if the relationship between the concaves and convexes of the oven wall and the pushing load can be grasped quantitatively.

However, in the above-stated conventional art, the priority of repair is just determined by using a surface shape of the damage of the oven wall as a reference. For example, it is conceivable that an influence on the pushing load is large when the damaged area is small but a depth of the cave is deep. It is also conceivable that the pushing loads are different depending on positions in a height direction of the oven wall even if the concaves and convexes are the same. Accordingly, in the conventional arts, there is a problem that it is difficult to really accurately and effectively perform the repair of the oven wall.

Patent Document 1: Japanese Laid-open Patent Publication No. 2003-183661
Patent Document 2: Japanese Laid-open Patent Publication No. 11-256166

SUMMARY OF THE INVENTION

The present embodiment is made in consideration of the above-stated problem, and a first object thereof is to enable to quantitatively grasp a relationship between a pushing load generated when coke is pushed from a coking chamber of a coke oven, and a state of concaves and convexes of an oven wall of the coking chamber.

Besides, a second object of the present embodiment is to enable to repair the oven wall of the coking chamber of the coke oven more effectively than before.

A coke oven wall surface evaluation apparatus of the present embodiment, evaluating a state of a side wall surface of a coking chamber of a coke oven operating while pushing produced coke with a pusher, the coke oven wall surface evaluation apparatus includes: a concave and convex information deriving unit deriving concave and convex information relating to concaves and convexes generated on the side wall surface of the coking chamber, based on image signals of the side wall surface of the coking chamber; a gradient information deriving unit deriving gradient information relating to a gradient relative to a pushing direction of the coke on the side wall surface of the coking chamber, based on the concave and convex information derived by the concave and convex information deriving unit; and an indexing unit deriving a resistance index in which a resistance received by the coke at a pushing time is indexed by using the gradient information derived by the gradient information deriving unit.

A coke oven wall surface repair supporting apparatus of the present embodiment, of which coke oven operates while pushing produced coke with a pusher, includes: a concave and convex information deriving unit deriving concave and convex information relating to concaves and convexes generated on a side wall surface of a coking chamber based on image signals of the side wall surface of the coking chamber of the coke oven; a concave and convex information changing unit changing the concave and convex information at a repair object region of the side wall surface of the coking chamber among the concave and convex information derived by the concave and convex information deriving unit into a repair value set in advance to make it new concave and convex information; a gradient information deriving unit deriving gradient information relating to a gradient relative to a pushing direction of the coke on the side wall surface of the coking chamber by using the concave and convex information changed by the concave and convex information changing unit; an indexing unit deriving a resistance index in which a resistance received by the coke at a pushing time is indexed by using the gradient information derived by the gradient information deriving unit; and a pushing load deriving unit deriving a pushing load corresponding to the resistance index derived by the indexing unit from resistance index pushing load correlation information set in advance representing a correspondence between the resistance index and the pushing load of the coke.

A coke oven wall surface evaluation method of the present embodiment, evaluating a state of a side wall surface of a coking chamber of a coke oven operating while pushing produced coke with a pusher, the coke oven wall surface evaluation method includes: performing a concave and convex information derivation deriving concave and convex information relating to concaves and convexes generated on the side wall surface of the coking chamber based on image signals of the side wall surface of the coking chamber; performing a gradient information derivation deriving gradient information relating to a gradient relative to a pushing direction of the coke on the side wall surface of the coking chamber, based on the concave and convex information derived by the performing the concave and convex information derivation; and performing an indexing deriving a resistance index in which a resistance received by the coke at a pushing time is indexed by using the gradient information derived by the performing the gradient information derivation.

A coke oven wall surface repair supporting method of the present embodiment, of which coke oven operates while pushing produced coke with a pusher, includes: performing a concave and convex information derivation deriving concave and convex information relating to concaves and convexes generated on a side wall surface of a coking chamber based on image signals of the side wall surface of the coking chamber of the coke oven; performing a concave and convex information change changing the concave and convex information at a repair object region of the side wall surface of the coking chamber among the concave and convex information derived by the performing the concave and convex information derivation into a repair value set in advance to make it new concave and convex information; performing a gradient information derivation deriving gradient information relating to a gradient relative to a pushing direction of the coke on the side wall surface of the coking chamber by using the concave and convex information changed by the performing the concave and convex information change; performing an indexing deriving a resistance index in which a resistance received by the coke at a pushing time is indexed by using the gradient information derived by the performing the gradient information derivation; and performing a pushing load derivation deriving a pushing load corresponding to the resistance index derived by the performing the indexing from resistance index pushing load correlation information set in advance representing a correspondence between the resistance index and the pushing load of the coke.

A computer program product of the present embodiment for causing a computer to execute processes to evaluate a state of a side wall surface of a coking chamber of a coke oven operating while pushing produced coke with a pusher, the program product includes: performing a concave and convex information derivation deriving concave and convex information relating to concaves and convexes generated on the side wall surface of the coking chamber based on image signals of the side wall surface of the coking chamber; performing a gradient information derivation deriving gradient information relating to a gradient relative to a pushing direction of the coke on the side wall surface of the coking chamber, based on the concave and convex information derived by the performing the concave and convex information derivation; and performing an indexing deriving a resistance index in which a resistance received by the coke at a pushing time is indexed by using the gradient information derived by the performing the gradient information derivation.

A computer program product of the present embodiment for causing a computer to execute processes to support a repair of a wall surface of a coke oven operating while pushing produced coke with a pusher, the program product includes: performing a concave and convex information derivation deriving concave and convex information relating to concaves and convexes generated on a side wall surface of a coking chamber based on image signals of the side wall surface of the coking chamber of the coke oven; performing a concave and convex information change changing the concave and convex information at a repair object region of the side wall surface of the coking chamber among the concave and convex information derived by the performing the concave and convex information derivation into a repair value set in advance to make it new concave and convex information; performing a gradient information derivation deriving gradient information relating to a gradient relative to a pushing direction of the coke on the side wall surface of the coking chamber by using the concave and convex information changed by the performing the concave and convex information change; performing an indexing deriving a resistance index in which a resistance received by the coke at the pushing time is indexed by using the gradient information derived by the performing the gradient information derivation; and performing a pushing load derivation deriving a pushing load corresponding to the resistance index derived by the performing the indexing from resistance index pushing load correlation information set in advance representing a correspondence between the resistance index and the pushing load of the coke.

BRIEF DESCRIPTION OF THE DRAWINGS

FIG. 5A illustrates the first embodiment, and is a view illustrating an example of a positional relationship between a photographing view field and laser spots of a linear image camera;

FIG. 7 illustrates the first embodiment, and is a view explaining an example of an oven wall three-dimensional profile data;

FIG. 8 illustrates the first embodiment, and is a view illustrating an example of a traced result of the laser spots;

FIG. 24 illustrates the second embodiment, and is a flowchart explaining an example of a repair simulation process of the coke oven wall surface repair supporting apparatus.

DETAILED DESCRIPTION OF THE PREFERRED EMBODIMENTS

First Embodiment

Hereinafter, a first embodiment is described with reference to the drawings.

Figure 1A:
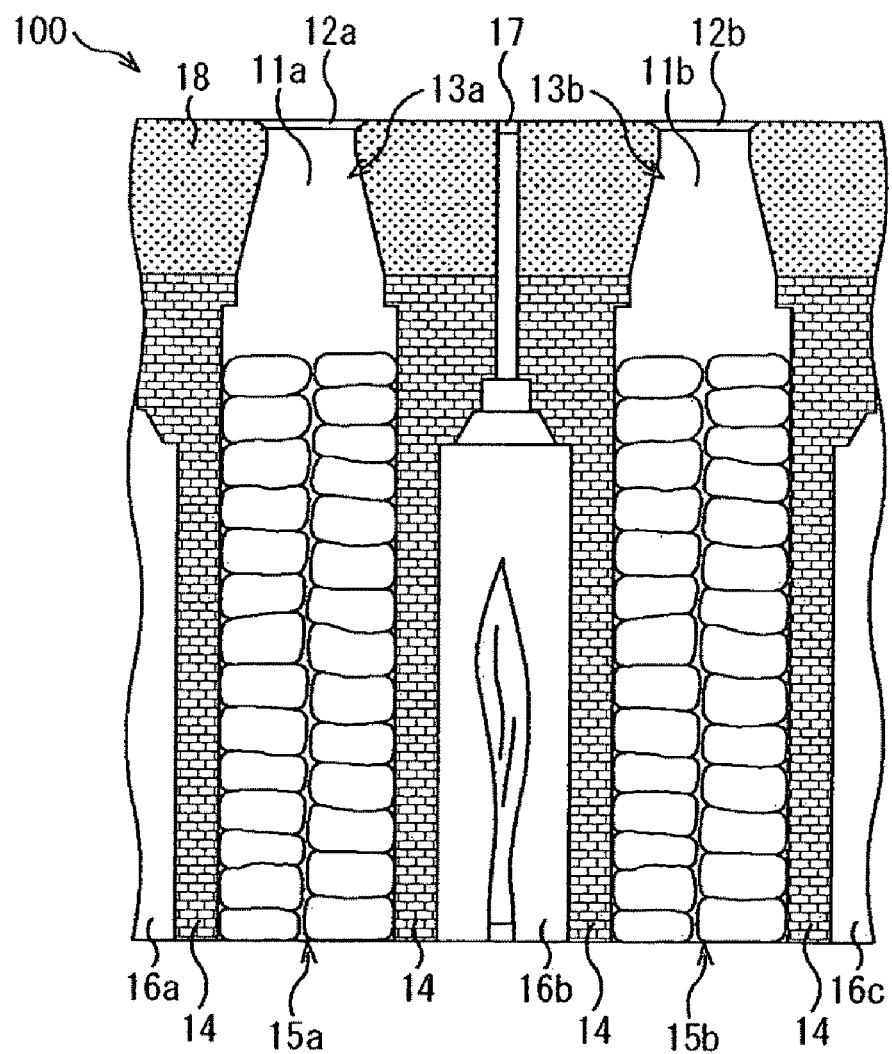
FIG. 1A illustrates a first embodiment, and is a longitudinal sectional view illustrating an example of an appearance in a vicinity of a coking chamber being a measurement object when it is seen in a depth direction of the coking chamber within all over a coke oven.
Figure 1B:
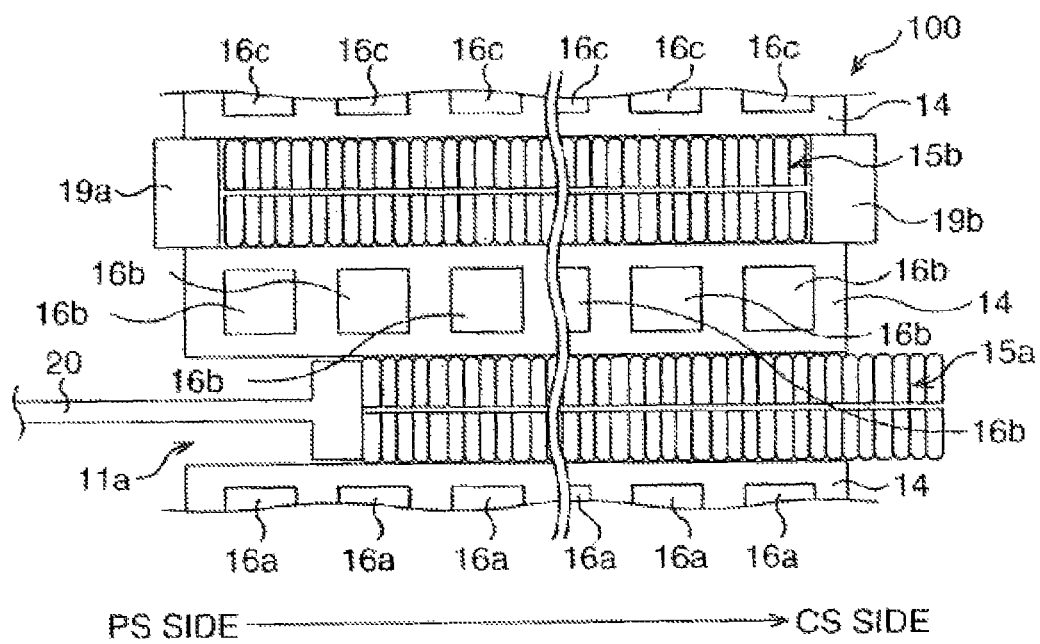
FIG. 1B illustrates the first embodiment, and is a cross-sectional view of the part illustrated in FIG. 1A when it is seen from an upper side of the coke oven within all over the coke oven.

FIG. 1A and FIG. 1B are views illustrating an example of a constitution of a coke oven. Specifically, FIG. 1A is a longitudinal sectional view illustrating an example of an appearance in a vicinity of a coking chamber being a measurement object when it is seen in a depth direction of the coking chamber within all over a coke oven 100. FIG. 1B is a cross-sectional view of the part illustrated in FIG. 1A when it is seen from an upper side of the coke oven 100 within all over the coke oven 100.

As illustrated in FIG. 1A, coking chambers 11a, 11b and combustion chambers 16a, 16b, 16c are disposed alternately via oven walls 14, in the coke oven 100. Coal is charged inside the coking chamber 11a from a coal charging hole 13a, and a coke 15 is produced. The coal is coked (carbonized) by heat from the combustion chambers 16a, 16b performing gas combustion, and thereby, the coke 15 is produced.

The oven wall 14 is formed by stacking, for example, firebricks. Temperature of the oven walls 14 during operation becomes high temperature of 1000° C. or more by the heat from the combustion chambers 16a, 16b, 16c. Besides, inside the coking chambers 11a, 11b become also high temperature of 1000° C. or more.

A ceiling refractory 18 is formed on the oven walls 14. Heights of the coking chambers 11a, 11b (oven wall 14) of the coke oven 100 of the present embodiment are 6 m, a height of the ceiling refractory 18 is 1.5 m, and diameters of the coal charging holes 13a, 13b are 0.4 m. Besides, a pusher side door 19a and a discharge side door 19b are provided at both end portions in a depth direction of the coking chamber 11b, as illustrated in FIG. 1B. In the present embodiment, a distance between these pusher side door 19a and discharge side door 19b (namely, a length in the depth direction of the coking chamber 11a, 11b is 16 m. Incidentally, a pusher side (a pushing source side) is called as a PS side, and a discharge side (a pushing destination side) is called as a CS side, in the following description according to need.

Incidentally, the coal charging holes 13a, 13b of the coking chambers 11a, 11b are closed by lids 12a, 12b. Further, an opening portion of the combustion chamber 16a to 16C is closed by a lid 17.

Besides, for example, when a coke 15a is produced, the pusher side door 19a and the discharge side door 19b are opened, as illustrated in FIG. 1B. A pusher ram 20 mounted on a pusher (not illustrated in the drawing) is inserted in the depth direction of the coking chamber 11a from the PS side, to pushe the coke 15a toward the CS side. The coke 15a is thereby taken out of the coke oven 100.

When the coke 15a is taken out of the coke oven 100 as stated above, the pushing load changes resulting from various factors as stated above. The pushing load can be measured based on an electric power of a motor driving the pusher ram 20, a torque generated at a shaft connecting the motor and the pusher ram 20, and so on.

Figure 2:
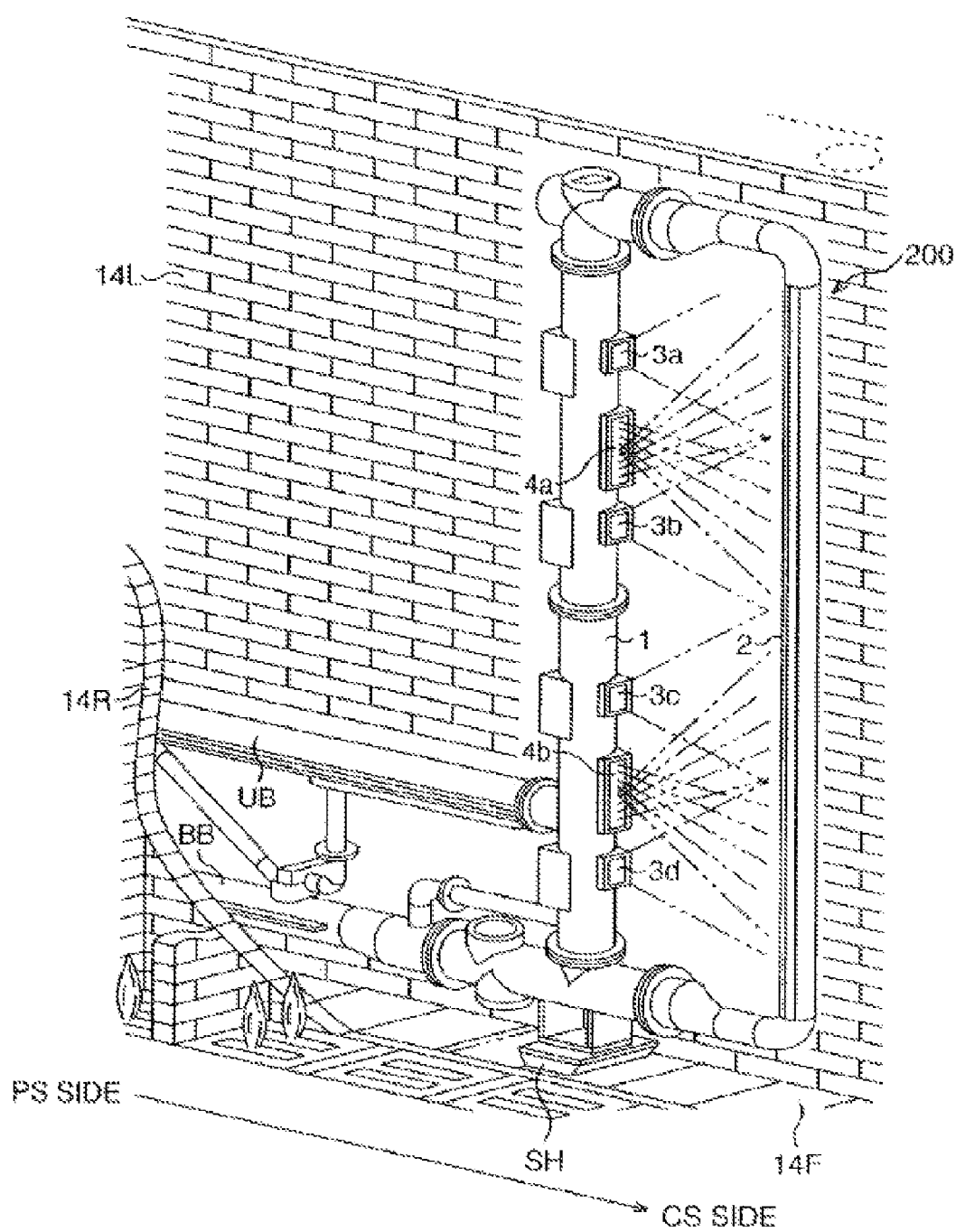
FIG. 2 illustrates the first embodiment, and is a view illustrating an example of an external constitution of a wall surface observation apparatus.

In the present embodiment, a wall surface observation apparatus illustrated in FIG. 2 is used to observe concaves and convexes on all over the wall surfaces (oven walls) at both sides of the coking chamber 11a, 11b of the coke oven 100 having the constitution as stated above. FIG. 2 is a view illustrating an example of an external constitution of the wall surface observation apparatus. In FIG. 2, an appearance when a wall surface observation apparatus 200 is inserted in the depth direction of the coking chamber 11a, 11b from the PS side of the coking chamber 11a, 11b is illustrated.

In FIG. 2, the wall surface observation apparatus 200 has a water-cooled lance formed by integrating a base beam BB, an upper beam UB, a vertical pole 1, and a mirror tube 2. The water-cooled lance is a high heat-resistance stainless-steel double tube, and cooling water is flowed between an inner tube and an outer tube. The cooling water is flowed as stated above, and thereby, an inside of the water-cooled lance is prevented from being exposed to the high temperature.

Specifically, the vertical pole 1 provided extendedly in a height direction of the coking chamber 11a, 11b is attached to a tip surface of the upper beam UB provided extendedly in the depth direction of the coking chamber 11a, 11b and to a tip upper surface of the base beam BB similarly provided extendedly in the depth direction of the coking chamber 11a, 11b. Besides, the mirror tube 2 provided extendedly in the height direction of the coking chamber 11a, 11b is attached to a tip surface of the base beam BB and to an upper end side surface of the vertical pole 1. As stated above, the vertical pole 1, the mirror tube 2, the upper beam UB and the base beam BB are formed integrally, and have a common inner space with each other.

Shielding plates 3a to 3d are provided with a predetermined interval in the height direction at a front surface of the vertical pole 1. Four linear image cameras provided inside the vertical pole 1 each photograph images projected on the mirror tube 2 via the shielding plates 3a to 3d. Namely, the linear image cameras photograph images of oven walls 14R, 14L at the right side and left side of the coking chamber 11a, 11b (refer to FIG. 3 and FIG. 4).

Besides, shielding plates 4a, 4b are each provided between the shielding plates 3a, 3b and between the shielding plates 3c, 3d. Laser projector groups 8a, 8b constituted by, for example, plural semiconductor lasers provided inside the vertical pole 1 project laser light at visual fields of the linear image cameras on the oven walls 14R, 14L at the right side and left side of the coking chamber 11*a*, 11*b* via the mirror tube 2 through the shielding plates 4*a*, 4*b* (refer to FIG. 3 and FIG. 4).

Besides, a shoe SH getting on an oven wall (floor surface) 14F of the coking chamber 11*a*, 11*b* is formed at a tip side of a bottom surface of the vertical pole 1. A tip portion of the water-cooled lance is supported by the oven wall (floor surface) 14F of the coking chamber 11*a*, 11*b* via this shoe SH. Incidentally, a rear end portion of the water-cooled lance is attached to and supported by a water-cooled lance insertion device (not illustrated in the drawing).

The water-cooled lance is inserted in the depth direction of the coking chamber 11*a*, 11*b* by using the water-cooled lance insertion device (not illustrated in the drawing) at outside the oven with the mirror tube 2 in the lead from the PS side of the coking chamber 11*a*, 11*b*. Accordingly, the water-cooled lance goes into the coking chamber 11*a*, 11*b* in the depth direction (CS side direction).

Figure 3:
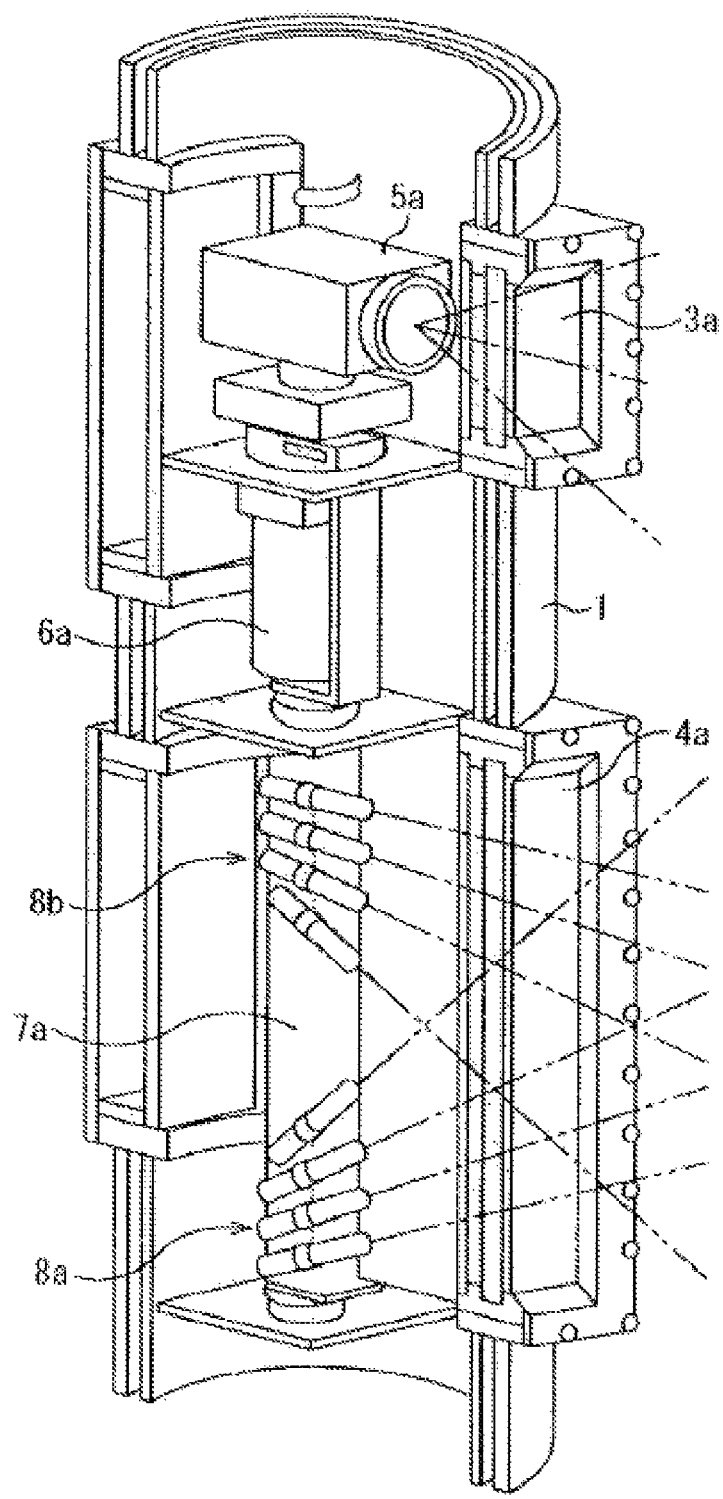
FIG. 3 illustrates the first embodiment, and is a view illustrating an example of an appearance of a part inside a vertical pole and where shielding plates are provided.

FIG. 3 is a view illustrating an example of an appearance of a portion inside the vertical pole 1, and where the shielding plates 3*a*, 4*a* are provided.

As illustrated in FIG. 3, a first linear image camera 5*a* is provided at a position inside the vertical pole 1 and at the position facing the shielding plate 3*a*. Besides, a laser projector group 8*a* constituted by 11*a*, 11*b* pieces of laser projectors and a laser projector group 8*b* similarly constituted by 11*a*, 11*b* pieces of laser projectors are provided at a position inside the vertical pole 1 and at the position facing the shielding plate 4*a*. A first electric motor 6*a* housing a speed reducer is provided between the first linear image camera 5*a* and the laser projector groups 8*a*, 8*b*. This first electric motor 6*a* is fixed to the vertical pole 1. Besides, the first linear image camera 5*a* and a supporting plate 7*a* are coupled to a rotation shaft (output shaft) of the first electric motor 6*a*. The laser projector groups 8*a*, 8*b* are fixed to the supporting plate 7*a*.

The laser projector group 8*a* is to form a laser spot, photographed by the first linear image camera 5*a* existing at upward thereof, on the oven wall 14. Meanwhile, the laser projector group 8*b* is to form a laser spot photographed by a second linear image camera existing at downward thereof which is not illustrated. The second linear image camera existing at downward of the laser projector group 8*b* is provided at a position inside the vertical pole 1 and at the position facing the shielding plate 3*b*. This second linear image camera is coupled to a rotation shaft of a not-illustrated second electric motor housing a speed reducer as same as the first linear image camera 5*a*. Besides, the second electric motor is fixed to the vertical pole 1. Incidentally, the laser projector groups 8*a*, 8*b* are not coupled to the second electric motor and the second linear image camera.

When the first electric motor 6*a* makes normal rotation under a state in which the first linear image camera 5*a* and the laser projector groups 8*a*, 8*b* are aiming at a tube shaft of the mirror tube 2, the first linear image camera 5*a* and the laser projector groups 8*a*, 8*b* turn to a position facing the oven wall 14L at the left side of the coking chamber 11*a*, 11*b*. Meanwhile, when the first electric motor 6*a* makes reverse rotation, the first linear image camera 5*a* and the laser projector groups 8*a*, 8*b* turn to a position facing the oven wall 14R at the right side of the coking chamber 11*a*, 11*b*.

According to the normal rotation of the first electric motor 6*a*, the second electric motor also makes the normal rotation. Accordingly, the second linear image camera also turns to a position facing the oven wall 14L at the left side of the coking chamber 11*a*, 11*b*. Similarly, the second electric motor also makes the reverse rotation according to the reverse rotation of the first electric motor 6*a*. Accordingly, the second linear image camera also turns to a position facing the oven wall 14R at the right side of the coking chamber 11*a*, 11*b*.

The similar constitution to the above-stated first and second linear image cameras, the laser projector groups 8*a*, 8*b*, and the first and second electric motors is also formed at a region inside the vertical pole 1 and at the region where the shielding plates 3*c*, 3*d*, 4*b* are formed. As stated above, four sets of the linear image camera and the laser projector group 8*a*, 8*b* are provided inside the vertical pole 1, in the present embodiment.

Figure 4:
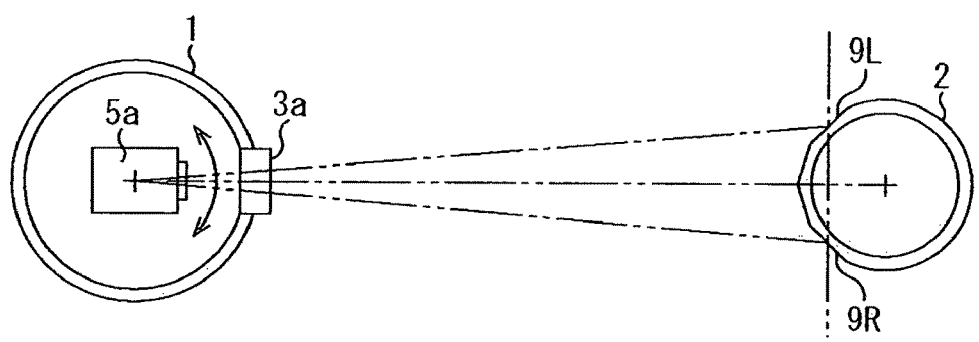
FIG. 4 illustrates the first embodiment, and is a view illustrating an example of a disposition relationship between the vertical pole and a mirror tube.

FIG. 4 is a view illustrating an example of a disposition relationship between the vertical pole 1 and the mirror tube 2. As stated above, four sets of the linear image camera and the laser projector group 8*a*, 8*b* are provided inside the vertical pole 1, but respective sets are the same except that places to be photographed are different. Accordingly, it is described only as for the set of the first linear image camera 5*a* and the laser projector group 8*a*, and the detailed descriptions for the other sets are not given according to needs.

As stated above, the first linear image camera 5*a* and the laser projector group 8*a* are capable of performing a turn driving while using a tube shaft of the vertical pole 1 as a rotation shaft. A left mirror surface 9L to observe the oven wall 14L at the left side of the coking chamber 11*a*, 11*b* from a front side, and a right mirror surface 9R to observe the oven wall 14R at the right side of the coking chamber 11*a*, 11*b* from a front side are formed at the mirror tube 2. A mirror polishing to be a mirror surface is performed, and thereafter, a chrome plating is performed for a surface of a stainless-steal outer tube, and thereby, these mirror surfaces 9L, 9R are formed.

When the first linear image camera 5*a* and the laser projector group 8*a* are turned to a position, for example, aiming at the left mirror surface 9L, the laser beam radiated from the laser projector group 8*a* is reflected by impinging on the left mirror surface 9L, to impinge on the oven wall 14L at the left side of the coking chamber 11*a*, 11*b*. A laser spot 52*a* to 52*k* then appears on the oven wall 14L at the left side of the coking chamber 11*a*, 11*b* (refer to FIG. 5A to FIG. 5C). In the present embodiment, for example, the laser spot 52*a* to 52*k* in a linear state of which length in a horizontal direction (width) is 30 mm, and length in a height direction (thickness) is 2 mm appears. As stated above, the laser projector group 8*a* is constituted by 11*a*, 11*b* pieces of laser projectors, and therefore, 11*a*, 11*b* pieces of laser spots 52*a* to 52*k* appear in the height direction of the oven wall 14.

In the present embodiment, light projection angles of the laser beam projected from the total 44 pieces of laser projectors are adjusted so that the 11*a*, 11*b* pieces of laser spots 52*a* to 52*k* and the laser spots formed by the three laser projector groups other than the laser projector group 8*a* appear in the height direction of the oven wall 14 with intervals of approximately 130 mm, when the oven wall 14 of the coking chamber 11*a*, 11*b* is flat.

In the present embodiment, the linear image camera 5*a* is a one-dimensional camera photographing the height direction of the oven wall 14 of the coking chamber 11*a*, 11*b*. For example, when the first linear image camera 5*a* and the laser projector group 8*a* are aiming at the left mirror surface 9L, a photographing view field 51 of the first linear image camera 5*a* is formed in the height direction of the oven wall 14 of the coking chamber 11*a*, 11*b*, as illustrated in FIG. 5A.

The laser spots 52*a* to 52*k* having the length in the horizontal direction (in the depth direction of the coking chamber 11*a*, 11*b*) are formed. Accordingly, it is allowed as long as the laser spots 52a to 52k exist within a range not completely deviating from the view field 51 of the linear image camera even if the region where the laser spots 52a to 52k are formed may deviate in the depth direction of the coking chamber 11a, 11b to some extent.

The oven wall 14 of the coking chamber 11a, 11b is a roughened surface, and therefore, the laser beam scatters in each direction from the laser spots 52a to 52k. A part of the scattered laser beam is reflected by, for example, impinging on the left mirror surface 9L, to enter the first linear image camera 5a.

Incidentally, an optical interference filter transmitting only a specific wavelength of a narrow-band is attached to the camera so as to emphasis the laser spots 52a to 52k relative to red thermoluminescence of the oven wall 14. This optical interference filter has a characteristic in which the transmission wavelength thereof shifts toward a short-wavelength side when the light is incident from an oblique direction. Accordingly, in the present embodiment, a filter transmitting light having a wavelength in a vicinity of 685 nm is used, and the laser projector forming the laser spots in a vicinity of a center of the photographing view field 51 is set to project the laser beam with the wavelength of 685 nm matching with the transmission band of the filter, and the laser projectors forming the laser spots at peripheral portions of the photographing view field 51 are set to project laser beam with a wavelength of 670 mm, among the laser projectors constituting the laser projector group 8a, 8b.

Figure 5B:
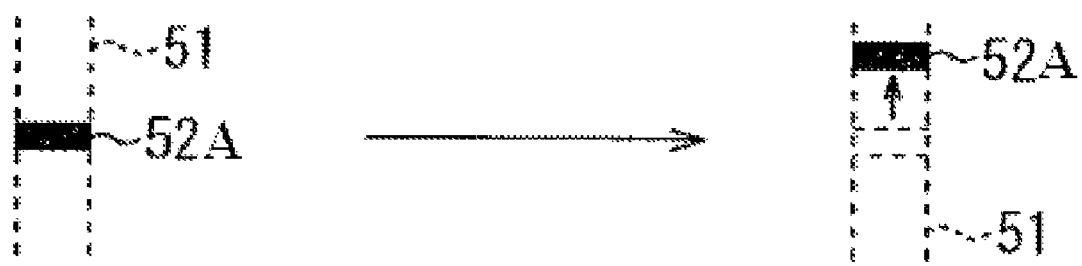
FIG. 5B illustrates the first embodiment, and is a view illustrating an example of a change of an image of the laser spot when a concave portion exists on the oven wall of the coking chamber.
Figure 5C:
FIG. 5C illustrates the first embodiment, and is a view illustrating an example of the change of the image of the laser spot when a convex portion exists on the oven wall of the coking chamber.

Here, when a concave portion exists on the oven wall 14 of the coking chamber 11a, 11b, a distance between the left mirror surface 9L and the oven wall 14 increases compared to a case when the oven wall 14 is flat. Accordingly, an image 52A of the laser spot 52a to 52k shifts toward upward on a screen of the linear image camera 5a, as illustrated in FIG. 5B. It is because the laser beam is projected obliquely from downward of the linear image camera 5a. On the other hand, when a convex portion exists on the oven wall 14 of the coking chamber 11a, 11b, a distance between the left mirror surface 9L and the oven wall 14 decreases compared to the case when the oven wall 14 is flat. Accordingly, the image 52A of the laser spot 52 shifts toward downward on the screen of the linear image camera 5a as illustrated in FIG. 5C. An amount in which the image 52A of the laser spot 52 shifts up and down is determined by a concave and convex amount and the laser projection angle. The projection angle of each laser is fixed, and therefore, it is possible to know the concave and convex amount of the oven wall 14 from the shift amount of the image 52A.

Incidentally, the laser spot image 52A on a photographic screen shifts toward upward at a position where the concave portion exists, and the laser spot image 52A on the photographic screen shifts toward downward at a position where the convex portion exists as stated above, as for the linear image camera existing at upward of the corresponding laser projector group 8a, 8b such as the first linear image camera 5a. On the other hand, the laser spot image 52A on the photographic screen shifts toward downward at the position where the concave portion exists, and the laser spot image 52A on the photographic screen shifts toward upward at the position where the convex portion exists, as for the linear image cameras existing at downward of the corresponding laser projector groups 8a, 8b such as the second linear image camera.

As stated above, when a pointing direction of the linear image camera and the laser projection group 8a, 8b is set at the left mirror surface 9L at the time of photographing the laser spot image 52A formed on the oven wall 14 of the coking chamber 11a, 11b, an image seeing the oven wall 14L at the left side of the coking chamber 11a, 11b from the front side is obtained. Besides, when the pointing direction of the linear image camera and the laser projection group 8a, 8b is set at the right mirror surface 9R, an image seeing the oven wall 14R at the right side of the coking chamber 11a, 11b from the front side is obtained.

Next, an example of a usage mode of the wall surface observation apparatus 200 is described. The pointing directions of the respective linear image cameras are set at the right mirror surface 9R, and the water-cooled lance is advanced into the coking chamber 11a, 11b. When one pulse of a transfer synchronization pulse, emitted every time when the water-cooled lance transfers 40 mm, is emitted, an A/D converter provided at the wall surface observation apparatus 200 performs an A/D conversion of image signals for one line of the respective linear image cameras. A CPU provided at the wall surface observation apparatus 200 writes the A/D converted image signals to a memory area for right wall surface constituted by a RAM, under a state distinguishable by which linear image camera the image signal is photographed.

When the processes as stated above are finished for approximately all over the length in the depth direction of the coking chamber 11a, 11b, the pointing directions of the respective linear image cameras are set at the left mirror surface 9L, and the measurement is performed similarly while pulling back the water-cooled lance.

Incidentally, it is described, for example, in International Patent Publication No. WO-00/55575 pamphlet, and Japanese Laid-open Patent Publication No. 2005-249698 as for the wall surface observation apparatus 200.

Figure 6:
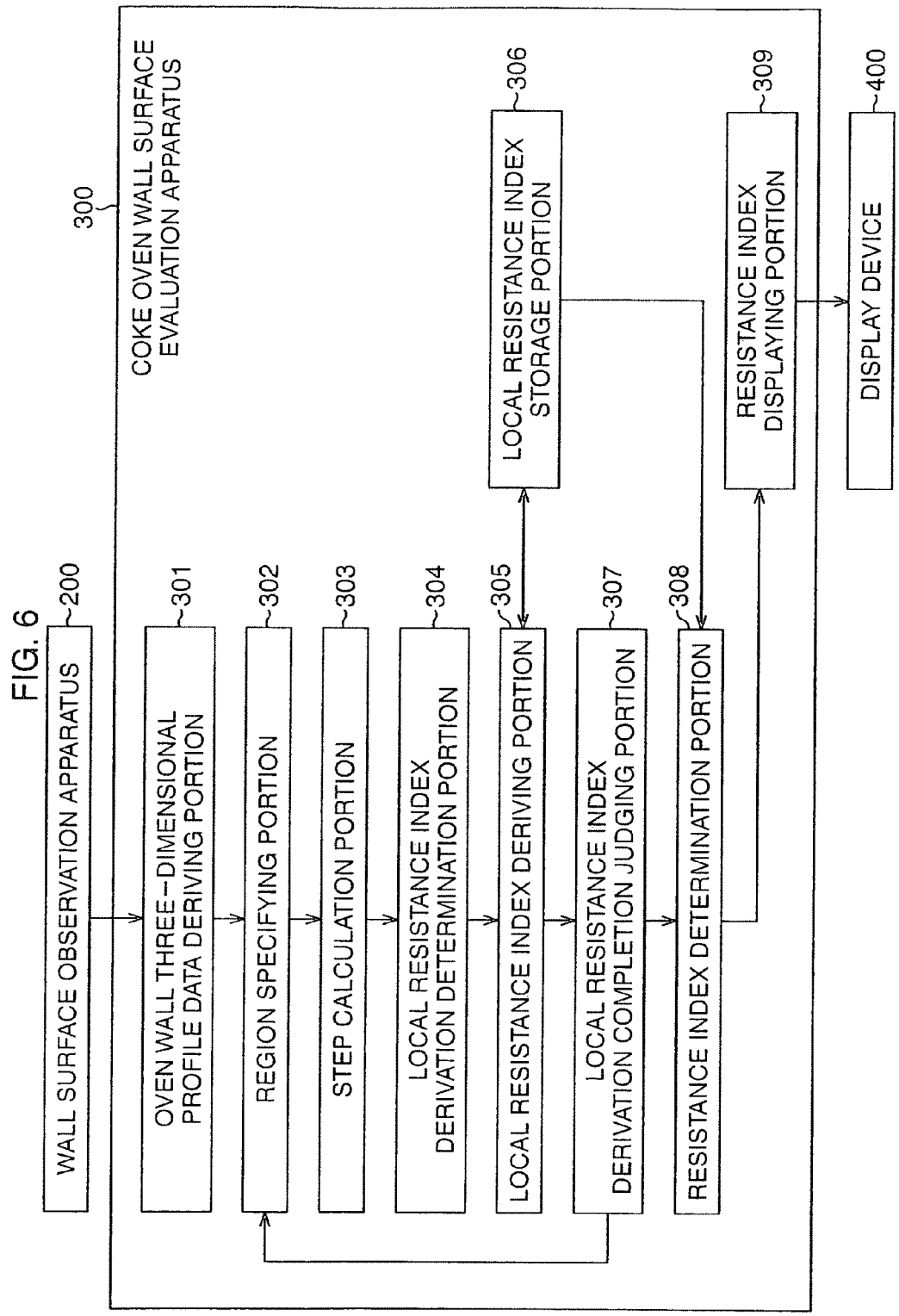
FIG. 6 illustrates the first embodiment, and is a view illustrating an example of a functional configuration of a coke oven wall surface evaluation apparatus.

Next, a coke oven wall surface evaluation apparatus is described. FIG. 6 is a view illustrating an example of a functional configuration of the coke oven wall surface evaluation apparatus. Incidentally, hardware of a coke oven wall surface evaluation apparatus 300 is an apparatus, for example, a personal computer and so on, including a CPU, a ROM, a RAM, a hard disk, and an image input/output board. Each block illustrated in FIG. 6 can be carried out by, for example, the CPU executing control programs stored in the ROM and the hard disk by using the RAM.

An oven wall three-dimensional profile data deriving portion 301 derives oven wall three-dimensional profile data of all over the oven walls 14R, 14L at the right side and left side of the coking chamber 11a, 11b based on the image signals obtained by the wall surface observation apparatus 200 as stated above. In the oven wall three-dimensional profile data, the concave and convex amount is represented as follows: a soundness part without any concave and convex damages is zero; the convex portion projecting in the coking chamber 11a, 11b is a positive value; and the concave portion caving adversely is a negative value. FIG. 7 is a view explaining an example of the oven wall three-dimensional profile data. Incidentally, here, the length in the depth direction of the coking chamber 11a, 11b (from the PS to the CS) is represented by "$D_0$" [m], and the height of the coking chamber 11a, 11b is represented by "$H_0$" [m].

In FIG. 7, data in which the concave and convex amounts ($z(1, 1)$ to $z(p, q)$) are asked for each of the plural regions (regions of (p×q) pieces in FIG. 7 (in which p, q are natural numbers of two or more) corresponding to the photographing regions of the oven walls 14R, 14L in the wall surface observation apparatus 200 based on the image signals obtained by the wall surface observation apparatus 200, become oven wall three-dimensional profile data 701.

Specifically, the oven wall three-dimensional profile data deriving portion 301 sequentially reads the image signals stored in the memory area for the right wall surface provided at the wall surface observation apparatus 200. After that, the laser spots 52a to 52k are traced in the depth direction (the direction from the PS side toward the CS side) of the coking chamber 11a, 11b by specifying a position of which brightness is the highest (a peak position) from the read image signals. As stated above, the traced results of the laser spots 52a to 52k are to be obtained 44 pieces because 44 pieces (11 pieces×4 sets) of laser spots 52a to 52k are obtained in the present embodiment.

FIG. 8 is a view illustrating an example of the traced results of the laser spots 52a to 52k. In FIG. 8, traced results 801a to 801d of the laser spots 52a to 52k become curves of which parameters are the positions of the laser spots 52a to 52k in the height direction of the coking chamber 11a, 11b and the positions in the depth direction of the coking chamber 11a, 11b. As stated above, each of the laser spots 52a to 52k shifts up and down in the height direction of the coking chamber 11a, 11b when the concave and convex portions exist on the oven wall 14 of the coking chamber 11a, 11b. Consequently, it is possible to detect the concave and convex amounts on all over the oven wall 14R at the right side of the coking chamber 11a, 11b by using the traced results 801a to 801d of the laser spots 52a to 52k. On the other hand, it is possible to detect the concave and convex amount as for the oven wall 14L at the left side of the coking chamber 11a, 11b by performing the similar process as the process for the image signals stored in the memory area for the right wall surface, by using image signals stored in a memory area for the left wall surface provided at the wall surface observation apparatus 200.

The oven wall three-dimensional profile data deriving portion 301 of the present embodiment adds the concave and convex amounts on all over the oven walls 14R, 14L at the right side and left side of the coking chamber 11a, 11b asked as stated above between the regions facing with each other, and outputs the added concave and convex amounts (z(1, 1) to z(p, q)) to a region specifying portion 302 as the oven wall three-dimensional profile data 701. Incidentally, signs of the added concave and convex amounts are negative as for a direction expanding from a soundness state of the oven wall 14 without concaves and convexes, and positive as for a direction narrowing adversely. When the coke 15 is pushed from the coking chamber 11a, 11b, the same catching resistance occurs if any deformation exists either on the oven wall at left side or right side. Accordingly, calculations performed after that become simple compared to a case when the calculations are performed separately for left and right.

As stated above, in the present embodiment, the oven wall three-dimensional profile data 701 being an example of a concave and convex matrix data is used as concave and convex information, and a concave and convex information deriving unit is carried out by using the oven wall three-dimensional profile data deriving portion 301.

Incidentally, in the following description, the oven wall three-dimensional profile data 701 obtained by adding the concave and convex amounts on all over the oven walls 14R, 14L at the right side and left side of the coking chamber 11a, 11b between the regions facing with each other, are called as added oven wall three-dimensional profile data 701 if necessary.

The region specifying portion 302 sequentially specifies the respective regions (concave and convex matrix data elements) of the added oven wall three-dimensional profile data 701 derived by the oven wall three-dimensional profile data deriving portion 301. In the example illustrated in FIG. 7, the (p×q) pieces of regions are specified in an order of (1, 1), . . . , (p, 1), (2, 1), . . . (p, q), and the added oven wall three-dimensional profile data 701 of the specified regions (local indexed object regions) are outputted to a step calculation portion 303.

As stated above, the wall surface observation apparatus 200 obtains the image signals with the interval of 40 mm in the depth direction (the direction from the PS side toward the CS side) of the coking chamber 11a, 11b. Besides, the wall surface observation apparatus 200 obtains the image signals with the interval of 130 mm in the height direction of the coking chamber 11a, 11b. Accordingly, the concave and convex amounts (z(1, 1) to z(p, q)) in the respective regions of the added oven wall three-dimensional profile data 701 illustrated in FIG. 7 are values representing a concave and convex amount of a rectangular region with a size of 40 mm in crosswise (the depth direction of the coking chamber 11a, 11b) and 130 mm in lengthwise (the height direction of the coking chamber 11a, 11b).

The step calculation portion 303 asks a step $\Delta Z$ [mm] of the region specified by the region specifying portion 302 based on the added oven wall three-dimensional profile data 701 outputted from the region specifying portion 302.

Figure 9A:
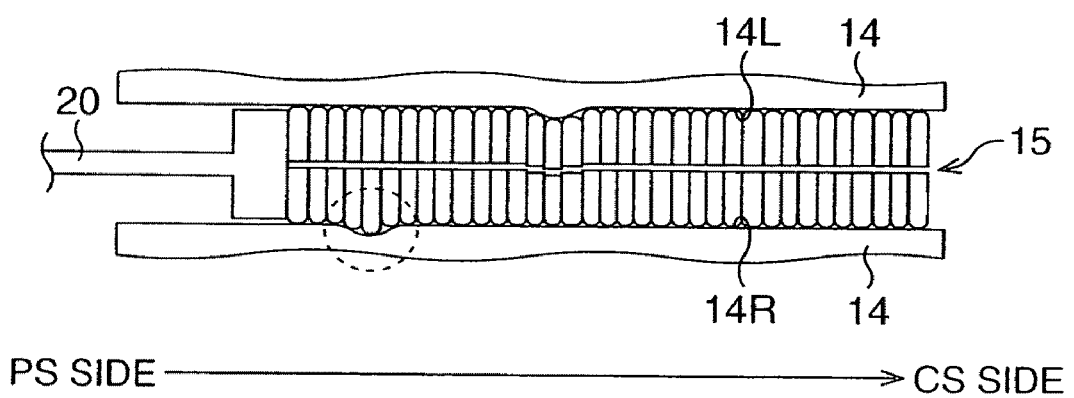
FIG. 9A illustrates the first embodiment, and is a view illustrating a cross-sectional view of a part of a coking chamber.
Figure 9B:
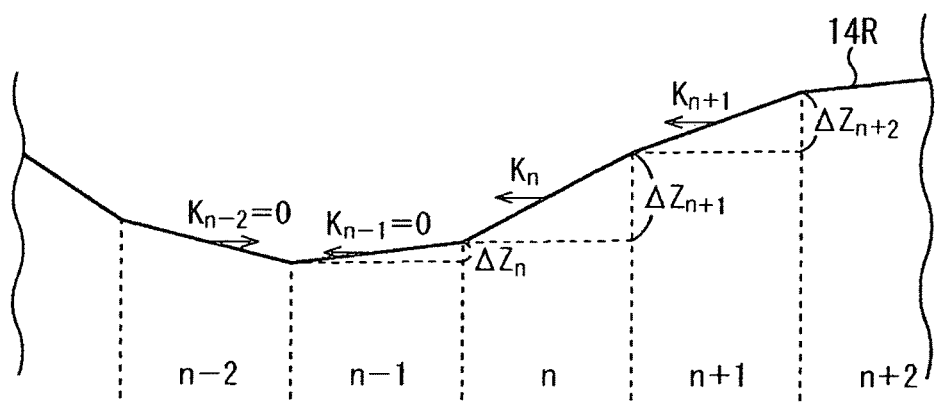
FIG. 9B illustrates the first embodiment, and is a view illustrating by modeling a part surrounded by a dotted line in FIG. 9A.

FIG. 9A and FIG. 9B are views illustrating examples of appearances of concaves and convexes of the oven wall 14 of the coking chamber 11a, 11b. Specifically, FIG. 9A is a view illustrating a cross-sectional view of a part of the coking chamber 11a, 11b, and FIG. 9B is a view illustrating by modeling the part surrounded by a dotted line in FIG. 9A.

As stated above, the region specifying portion 302 specifies the (p×q) pieces of regions in the order of (1, 1), . . . , (p, 1), (2, 1), . . . (p, q) in the added oven wall three-dimensional profile data 701 illustrated in FIG. 7. The step calculation portion 303 derives the step $\Delta Z$ between a region specified this time and a region specified the last time from the concave and convex amount of the region specified this time by the region specifying portion 302 and the concave and convex amount of the region adjacent with each other which is specified the last time. For example, in FIG. 9B, when a region "n" is specified, the step $\Delta Z$, between the region "n" and a region (n−1) is derived from the concave and convex amount of the region "n" and the concave and convex amount of the region (n−1). Incidentally, in the added oven wall three-dimensional profile data 701, the concave and convex amount of the region becomes the step $\Delta Z$ as for the region at a first column. Otherwise, the step $\Delta Z_n$ may be calculated from a second column.

As stated above, the image signals are obtained with the interval of 40 mm in the depth direction (the direction from the PS side toward the CS side) of the coking chamber 11a, 11b. Accordingly, the step $\Delta Z$ is a gradient at the region specified by the region specifying portion 302, and it becomes information representing a gradient relative to a pushing direction of the coke 15. Namely, the step $\Delta Z$ being a difference value between elements of the concave and convex matrix becomes the information representing local gradients.

As stated above, in the present embodiment, a gradient information deriving unit is carried out by using the step calculation portion 303.

A local resistance index derivation determination portion 304 determines whether a local resistance index $k_{i,j}$ is derived or not as for the region specified by the region specifying portion 302. Specifically, the local resistance index derivation determination portion 304 determines to derive the local resistance index $k_{i,j}$ when the step $\Delta Z$ derived by the step calculation portion 303 is larger than a constant "δ". Here, the local resistance index is the one in which a resistance received by the coke 15 pushed by the pusher ram 20, from a rising gradient of the region specified by the region specifying portion 302, is indexed. As stated above, in the present embodiment, the local resistance index $k_{i,j}$ is used as a local resistance index.

On the other hand, when the step ΔZ derived this time by the step calculation portion 303 is "δ" (δ>0) or less, the local resistance index $k_{i,j}$ is set at "0" (zero).

When the step ΔZ derived this time by the step calculation portion 303 is "0" (zero) or less, the region specified by the region specifying portion 302 has a falling gradient relative to the pushing direction of the coke 15. In this case, the resistance received by the coke 15 pushed by the pusher ram 20 from the gradient of the region specified by the region specifying portion 302 does not occur. Accordingly, when the step ΔZ derived this time by the step calculation portion 303 is less than "0" (zero), the local resistance index $k_{i,j}$ in which the resistance is indexed is set at "0" (zero). Besides, the resistance received by the coke 15 pushed by the pusher ram 20 from the gradient of the region specified by the region specifying portion 302 can be ignored when the step ΔZ derived this time by the step calculation portion 303 represents a positive value, but the value is small. Because, a space of approximately 1 mm to 2 mm called as a scale loss is generated between the coke 15 and the oven wall 14. Accordingly, in the present embodiment, when the step ΔZ derived this time by the step calculation portion 303 represents the positive value but the value is small, the local resistance index $k_{i,j}$ is set at "0" (zero). Incidentally, the constant "δ" can be set as an arbitrary value of, for example, 1 mm or more and 2 mm or less corresponding to an amount of the scale loss.

The local resistance index deriving portion 305 derives the local resistance index $k_{i,j}$ of the region specified by the region specifying portion 302 when the local resistance index derivation determination portion 304 determines to derive the local resistance index $k_{i,j}$.

Specifically, the local resistance index deriving portion 305 derives the local resistance index $k_{i,j}$ at a region (i, j) (in which "i" is a natural number of "1" or more and "p" or less, and "j" is a natural number of "1" or more and "q" or less) by using the following expression (1).

[Expression 1]

$$k_{i,j} = \left(1 + \frac{\varepsilon + d}{D_0}\right) \times \left\{1 + \frac{\gamma(H_0 - h)}{H_0}\right\} \times (\Delta Z)^\alpha + \beta \times k_{i-1,j} \quad (1)$$

Here, "$D_o$" is the length [m] in the depth direction of the coking chamber 11a, 11b (from the PS to the CS), and "$H_0$" is the height [m] of the coking chamber 11a, 11b. These "$D_0$", "$H_0$" are determined by a shape of the coking chamber 11a, 11b, and stored in the ROM provided at the coke oven wall surface evaluation apparatus 300 in advance.

Figure 10A:
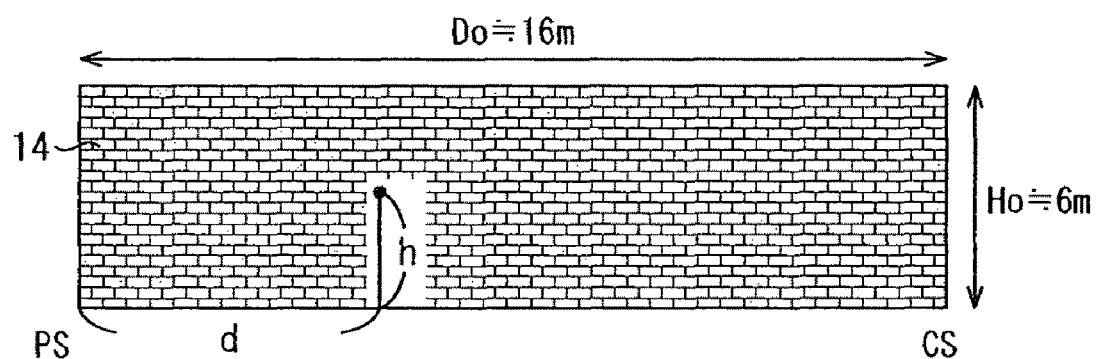
FIG. 10A illustrates the first embodiment, and is a view illustrating an oven wall of the coking chamber.

In which "d" is a position of the region specified by the region specifying portion 302, and is a position [m] in the depth direction of the coking chamber 11a, 11b, "h" is a position of the region specified by the region specifying portion 302, and is a position [m] in the height direction of the coking chamber 11a, 11b (refer to FIG. 10A). These "d", "h" are positions (d=i×40 mm, h=j×130 mm), corresponding to the region specified by the region specifying portion 302, and can be obtained from the added oven wall three-dimensional profile data 701 derived by the oven wall three-dimensional profile data deriving portion 301.

In which "α" is a constant given to the step ΔZ of the region specified this time by the region specifying portion 302. In which "β" is a constant given to the local resistance index $k_{i-1,j}$ of the region specified the last time by the region specifying portion 302. In the present embodiment, the power (the power of the constant "α") of the step ΔZ of the region specified this time by the region specifying portion 302 is calculated based on the present inventors observation that the local resistance index $k_{i,j}$ increases exponentially as the step ΔZ is getting large.

Besides, in the present embodiment, the local resistance index $k_{i,j}$ of the region specified this time by the region specifying portion 302 is derived in consideration of the local resistance index $k_{i,j}$ of the region specified the last time by the region specifying portion 302 (the region adjacent to the region specified this time by the region specifying portion 302 at the pushing source side of the coke 15). This is because the resistance from the gradient of the region specified by the region specifying portion 302 received by the coke 15 pushed by the pusher ram 20 becomes larger when the regions of the rising gradients continue compared to a case when the region of the rising gradient and the region of the falling gradient exist alternatively. In the present embodiment, the constant "β" is defined based on the observation of the present inventors that it is preferable to adjust an influence of the local resistance index $k_{i-1,j}$ of the region specified the last time by the region specifying portion 302, by multiplying the constant "β" by the local resistance index $k_{i-1,j}$ of the region specified the last time by the region specifying portion 302.

Figure 10B:
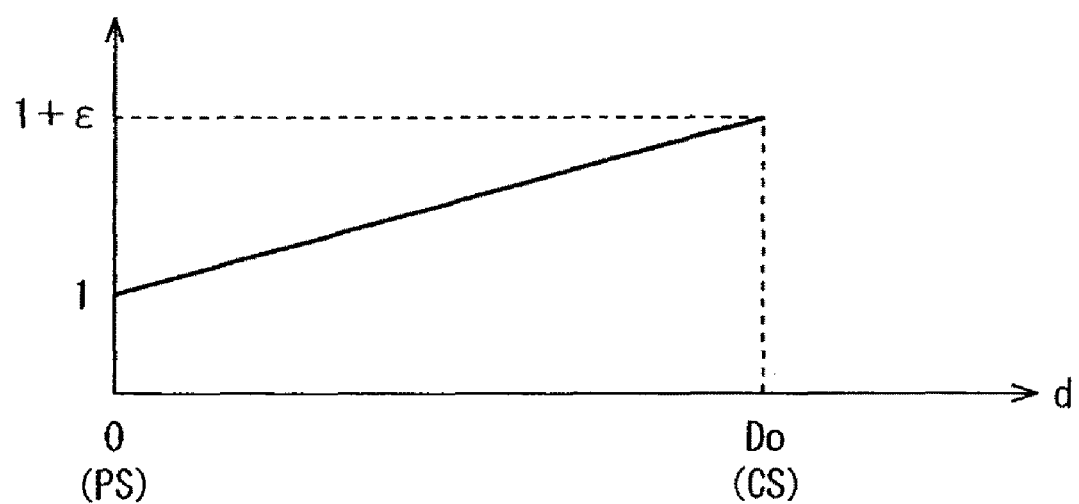
FIG. 10B illustrates the first embodiment, and is a view illustrating an example of a relationship between a weighting coefficient and a position in a depth direction of the coking chamber.
Figure 10C:
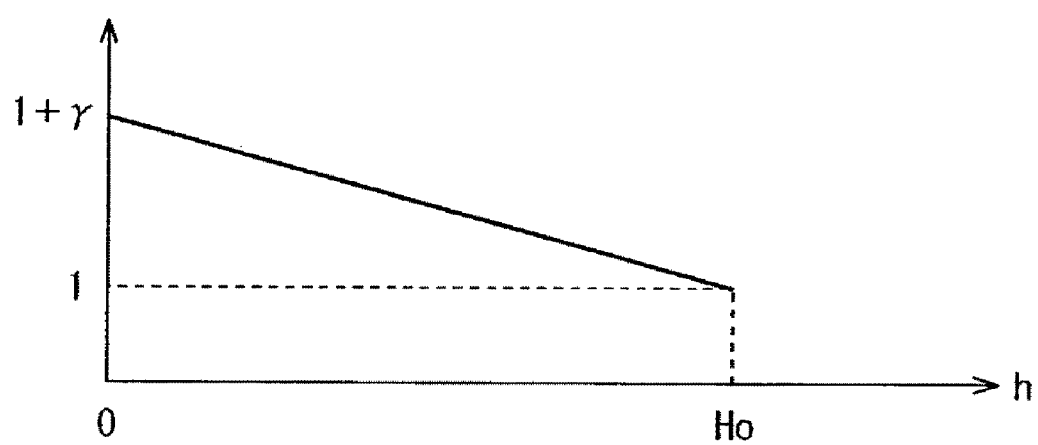
FIG. 10C illustrates the first embodiment, and is a view illustrating an example of a relationship between the weighting coefficient and a position in a height direction of the coking chamber.

In which "ε" is a weighting coefficient in which a value depends on the position in the depth direction of the coking chamber 11a, 11b (the direction from the PS side to the CS side), and a first parenthesis $(1+(\varepsilon \times d)/D_0)$ at the right side of the expression (1) represents the weight corresponding to the position in the depth direction. Besides, "γ" is a weighting coefficient in which a value depends on the position in the height direction of the oven wall 14 of the coking chamber 11a, 11b, and a second parenthesis $(1+\{\gamma(H_0-h)/H_0\})$ at the right side of the expression (1) represents the weight for the position in the height direction. FIG. 10A to FIG. 10C are views explaining the weighting coefficients "ε", "γ". Specifically, FIG. 10A is a view illustrating the oven wall 14 of the coking chamber 11a, 11b, FIG. 10B is a view illustrating an example of a relationship between the weighting coefficient "ε" and the position "d" in the depth direction of the coking chamber 11a, 11b, and FIG. 10C is a view illustrating an example of a relationship between the weighting coefficient "γ" and the position "h" in the height direction of the coking chamber 11a, 11b.

As illustrated in FIG. 10B, the weight for the position in the depth direction represented by the weighting coefficient "ε" becomes large as the position gets away from the PS side (the pushing source side). This is because the further the concave and convex to be a pushing resistance exists at a position getting away from the PS side, the longer a distance from the pusher to the pusher ram 20 becomes. Accordingly, a force from the pusher ram 20 received by the coke 15 existing at the position becomes small resulting from a propagation loss. Namely, the further the coke 15 exists at the position getting away from the PS side, the more pushing load is required, even if the states of the oven walls 14 and the cokes 15 are the same. In the present embodiment, the weighting coefficient "ε" is defined so that the weighting coefficient "ε" increases linearly according to an increase of the position "d" in the depth direction of the coking chamber 11a, 11b.

Besides, as illustrated in FIG. 10C, the weight for the position in the height direction represented by the weighting coefficient "γ" becomes large as the position is low in height. This is because a constraint resulting from its own weight of the coke 15 existing on the coke 15 is generated, and the deformation of the coke 15 passing through the step of the concave and convex portion is difficult to occur as the lower the coke 15 positions in height. Namely, the lower the coke 15 positions, the more pushing load is required, even if the states of the oven walls 14 and the cokes 15 are the same. In the present embodiment, the definition is made so that the weight decreases linearly as the increase of the position "h" in the height direction of the coking chamber 11a, 11b.

The above-stated constants "α", "β", and the weighting coefficients "ε", "γ" are arbitrary real numbers determined based on results of numerical simulations performed by modeling the operation pushing the coke 15 from the coking chamber 11a, 11b, actual operation results, and so on, and they are stored in the ROM provided at the coke oven wall surface evaluation apparatus 300 in advance. It is necessary to define "ε", "β", "ε", and "γ" capable of indexing the oven wall state with high accuracy from a point of view of the coke pushing capability. The present inventors investigate general ranges of the constants "α", "β", and the weighting coefficients "ε", "γ" by using definite operation data. As a result, for example, they are values within ranges as follows: in which "α" is 1.2 or more and 2.5 or less, "β" is 0.1 or more and 1.0 or less, "ε" is "0" (zero) or more and 5 or less, and "γ" is "0" (zero) or more and 5 or less.

Incidentally, when the region of the first column of the added oven wall three-dimensional profile data 701 is specified by the region specifying portion 302, the local resistance index deriving portion 305 derives the local resistance index $k_{i-1,j}$ by setting the local resistance index $k_{i-1,j}$ of the region specified the last time at "0" (zero) in the expression (1).

Besides, when the added oven wall three-dimensional profile data 701 includes measurement noise, a smoothing process is desirable to be performed for the data. For example, it is preferable that the local resistance index $k_{i,j}$ is derived by using a value in which the added oven wall three-dimensional profile data 701 of the region specified by the region specifying portion 302 and the added oven wall three-dimensional profile data 701 of the region adjacent to the added oven wall three-dimensional profile data 701 in the depth direction and in a longitudinal direction are averaged as the added oven wall three-dimensional profile data 701 of the region specified by the region specifying portion 302.

The local resistance index deriving portion 305 temporary stores the local resistance index derived as stated above, into a local resistance index storage portion 306 constituted by the RAM provided at the coke oven wall surface evaluation apparatus 300.

As stated above, in the present embodiment, the weighting coefficient "ε" is used as the first weighting coefficient, and the weighting coefficient "γ" is used as the second weighting coefficient.

A local resistance index derivation completion judging portion 307 judges whether the local resistance indexes $k_{i,j}$ are derived by the local resistance index deriving portion 305 or not as for all of the regions of the added oven wall three-dimensional profile data 701. When the local resistance indexes $k_{i,j}$ are not derived by the local resistance index deriving portion 305 as for all of the regions of the added oven wall three-dimensional profile data 701, the local resistance index derivation completion judging portion 307 transmits a local resistance index derivation not completion signal representing the above to the region specifying portion 302. The region specifying portion 302 specifies the next region of the added oven wall three-dimensional profile data 701 derived by the oven wall three-dimensional profile data deriving portion 301. In the present embodiment, the order to specify the regions of the added oven wall three-dimensional profile data 701 is the sequence of (1, 1), (p, 1), (2, 1), (p, q) (refer to FIG. 7) as it is described before.

On the other hand, when the local resistance indexes $k_{i,j}$ are derived by the local resistance index deriving portion 305 as for all of the regions of the added oven wall three-dimensional profile data 701, namely, in the example illustrated in FIG. 7, when the region (p, q) is specified by the region specifying portion 302, and the local resistance index $k_{p,q}$ is derived by the local resistance index deriving portion 305, the local resistance index derivation completion judging portion 307 outputs a local resistance index derivation completion signal representing the above to a resistance index determination portion 308. The resistance index determination portion 308 inputting the local resistance index derivation completion signal reads all of the local resistance indexes $k_{i,j}$ stored in the local resistance index storage portion 306, and derives a resistance index "k" from the read local resistance indexes $k_{i,j}$ by using the following expression (2). After that, the resistance index determination portion 308 stores the derived resistance index "k" into, for example, a hard disk.

[Expression 2]

$$k = \sum_{i,j} k_{i,j} \qquad (2)$$

As stated above, in the present embodiment, the resistance index "k" is used as the resistance index, and an indexing unit is carried out by using the local resistance index derivation determination portion 304, the local resistance index deriving portion 305, the local resistance index storage portion 306, and the resistance index determination portion 308.

A resistance index displaying portion 309 displays the resistance index "k" derived by the resistance index determination portion 308 on a display device 400 including a computer display such as an LCD (Liquid Crystal Display).

Figure 11:
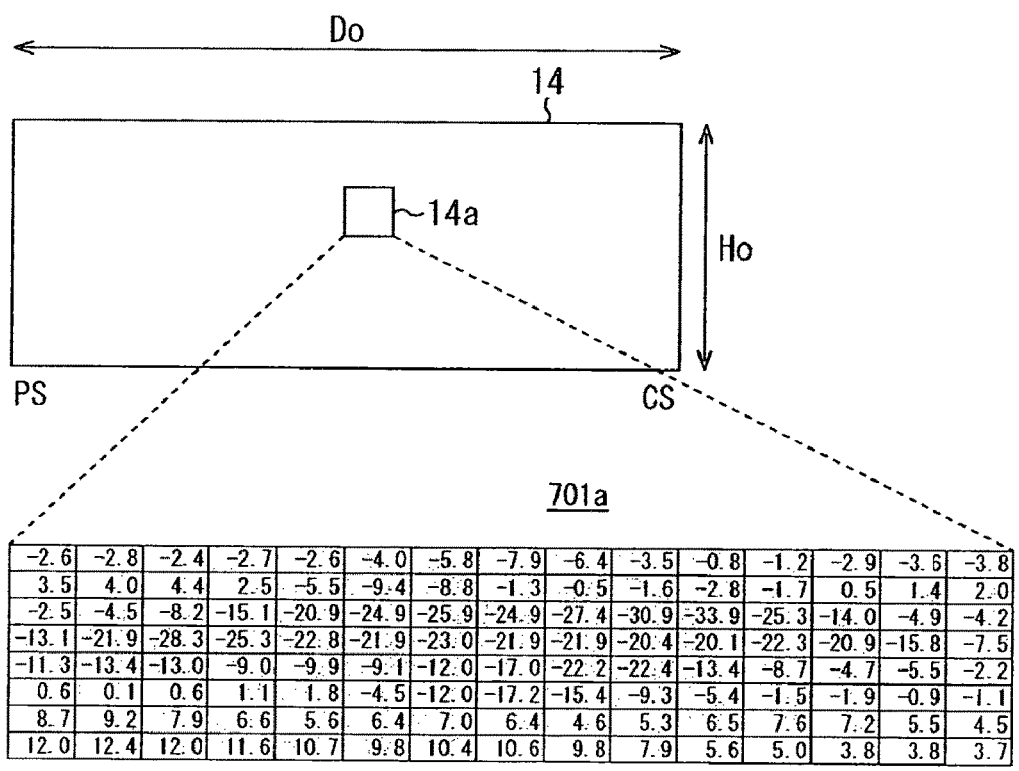
FIG. 11 illustrates the first embodiment, and is a view illustrating an example of added oven wall three-dimensional profile data derived by the coke oven wall surface evaluation apparatus, and local resistance indexes derived by the coke oven wall surface evaluation apparatus based on the added oven wall three-dimensional profile data.
Figure 12:
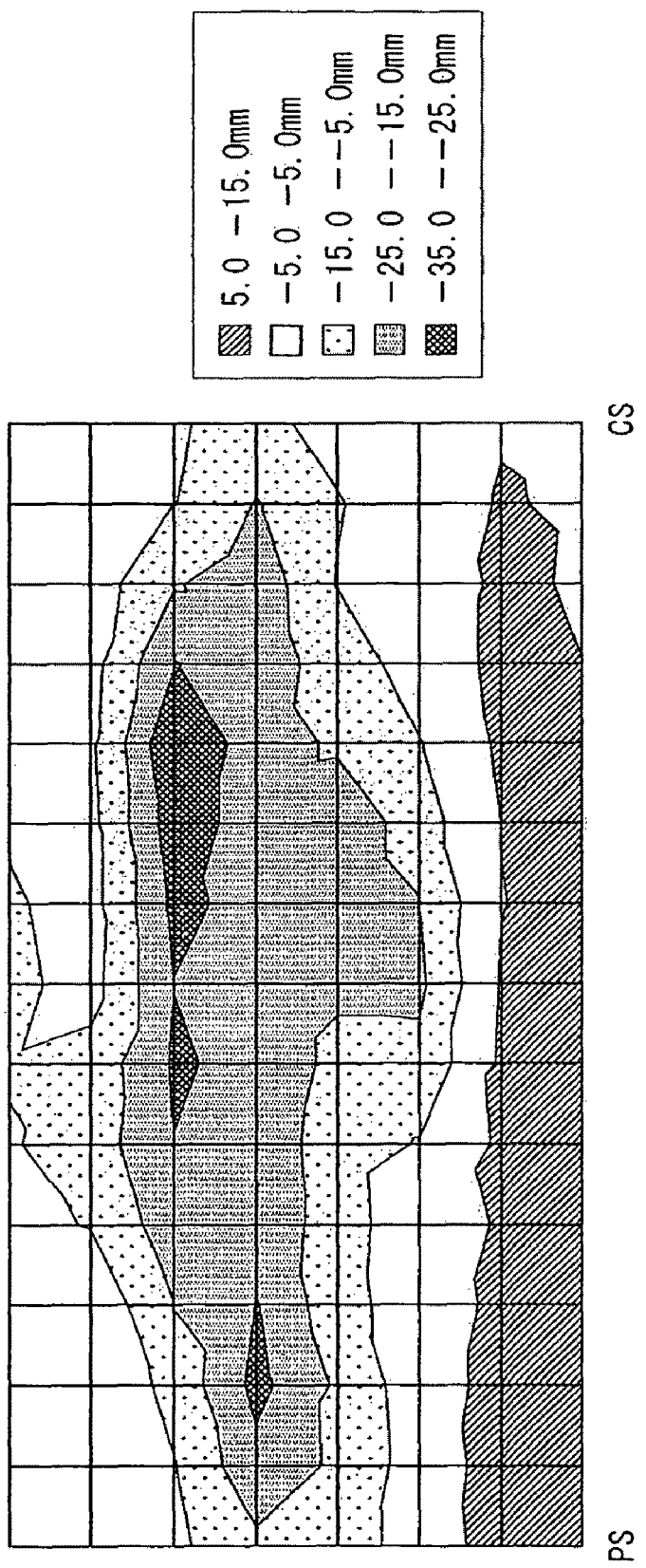
FIG. 12 illustrates the first embodiment, and is a view imaging concave and convex amounts represented by the added oven wall three dimensional profile data of all over the oven walls at a right side and left side by using contour lines.

FIG. 11 is a view illustrating an example of the added oven wall three-dimensional profile data 701a derived by the coke oven wall surface evaluation apparatus 300 as stated above, and the local resistance indexes $k_{i,j}$ derived by the coke oven wall surface evaluation apparatus 300 based on the added oven wall three-dimensional profile data 701a. Besides, FIG. 12 is a view imaging the concave and convex amount represented by the added oven wall three-dimensional profile data 701 of all over the oven walls 14R, 14L at the right side and left side including the added oven wall three-dimensional profile data 701a illustrated in FIG. 11, by using contour lines. Incidentally, in FIG. 11, the added oven wall three-dimensional profile data 701a and the local resistance indexes $k_{i,j}$ are illustrated as for a part 14a of the oven walls 14 at the right and left in the coking chamber 11a, 11b. Besides, a unit of the numerical value of the added oven wall three-dimensional profile data 701a illustrated in FIG. 11 is [mm].

In FIG. 11, for example, the local resistance indexes $k_{i,j}$ at the regions (12, 3), (13, 3), (14, 3) of the added oven wall three-dimensional profile data 701a are "30", "51", "34" respectively. As stated above, it can be seen that the local resistance index $k_{i,j}$ is generated when the gradient of the oven wall of the coking chamber 11a, 11b is steeper rising gradient than the gradient settled by the constant "δ" relative to the direction in which the coke 15 is pushed from the coking chamber 11a, 11b.

As stated above, the wall surface observation apparatus 200 obtains the image signals with the interval of 40 mm in the depth direction of the coking chamber 11a, 11b (the direction from the PS side toward the CS side). The reason why the image signals are obtained with the interval of 40 mm in the depth direction of the coking chamber 11a, 11b is that a minimum value of the length in the depth direction of the coking chamber 11a, 11b of the coke block constituting the coke 15 is estimated to be 80 mm, in this embodiment.

Figure 13A:
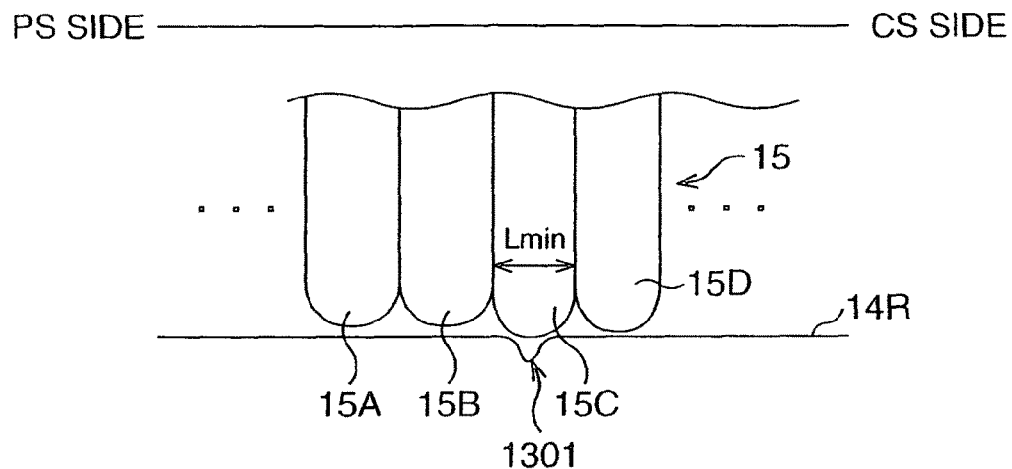
FIG. 13A illustrates the first embodiment, and is a view illustrating an appearance in which a concave portion with an opening width smaller than a length of a coke block exists at a position of the coke block.
Figure 13B:
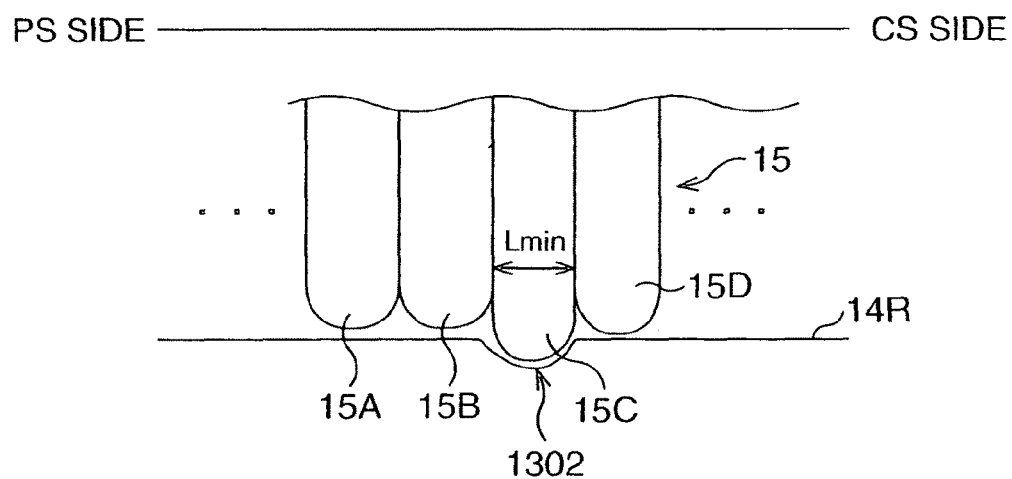
FIG. 13B illustrates the first embodiment, and is a view illustrating an appearance in which the concave portion with the opening width as same as the length of the coke block exists at the position of the coke block.

FIG. 13A and FIG. 13B are views explaining that the coke 15 is pushed while being affected by the concaves and convexes generated on the oven wall 14R at the right side of the coking chamber 11a, 11b.

FIG. 13A illustrates an appearance in which there is a concave portion 1301 with an opening width smaller than a length Lmin of a coke block 15C at a position of the coke block 15C. As illustrated in FIG. 13A, the coke block having the minimum value of Lmin in length in the depth direction of the coking chamber 11a, 11b is the coke block 15C among the coke blocks 15A to 15D constituting the coke 15. The coke blocks 15A to 15D are unable to enter into the concave portion 1301 even if there is the concave portion 1301 of which opening width is smaller than the length Lmin of the coke block 15C on the oven wall 14R, and therefore, they are pushed from the coking chamber 11a, 11b without practically being affected by the concave portion 1301.

On the other hand, FIG. 13B illustrates an appearance in which there is a concave portion 1302 of which opening width is as same as the length Lmin of the coke block 15C at the position of the coke block 15C. In this case, the coke block 15C is formed while entering into the concave portion 1302, and therefore, the resistance occurs when they are pushed. The minimum image signal interval in the depth direction capable of catching the concave portion of which opening width is Lmin is a half times of the length Lmin of the coke block 15C (=Lmin÷2) or less, according to a sampling theorem. It is not preferable for performing the calculation to make the image signal interval in the depth direction small more than necessary, because a data size of the added oven wall three-dimensional profile data 701 becomes large. Accordingly, in the present embodiment, the image signal interval in the depth direction is set at 40 mm which is a half times of the length Lmin of the coke block 15C.

Figure 14:
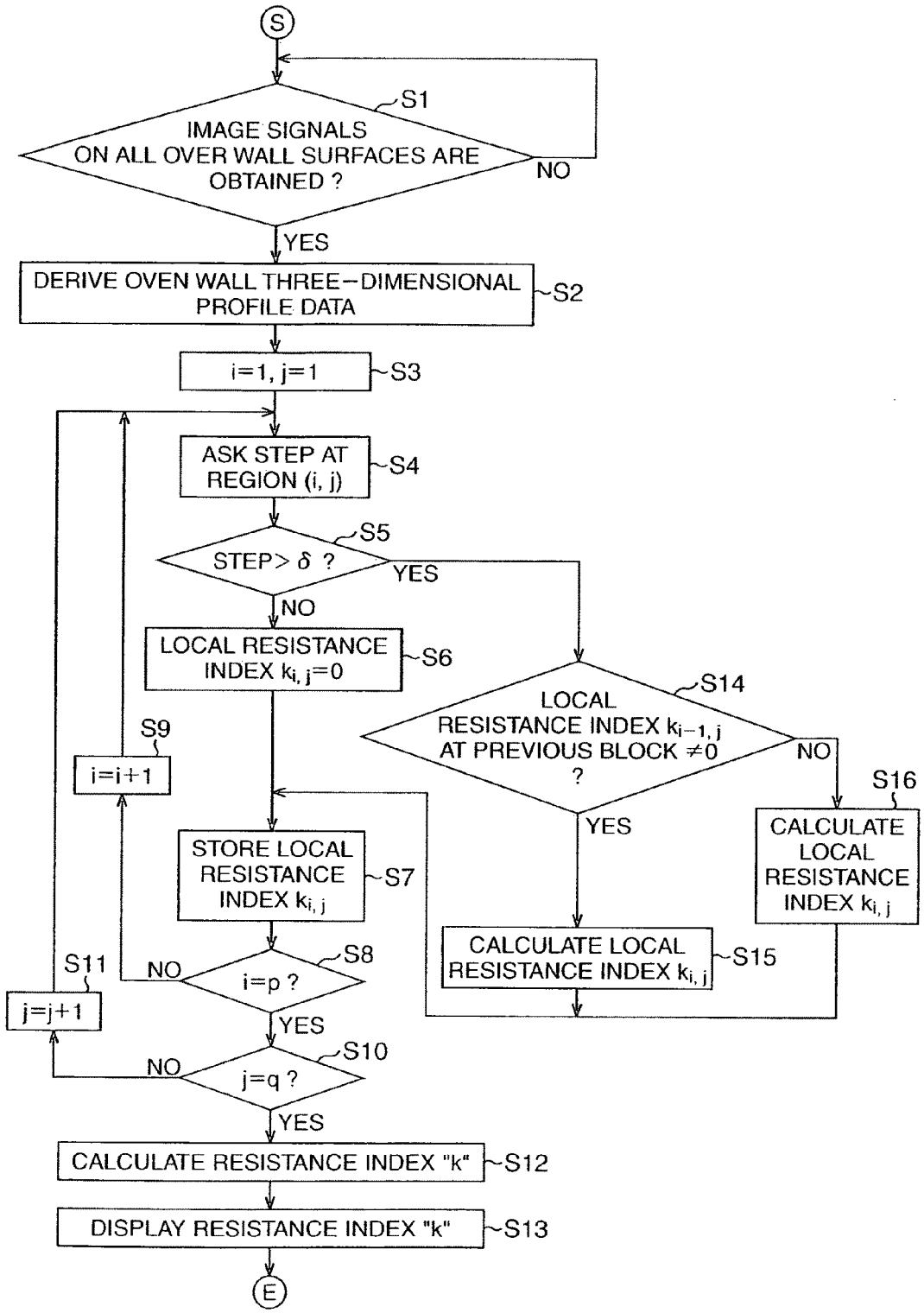
FIG. 14 illustrates the first embodiment, and is a flowchart explaining an example of process operations of a coke oven wall surface evaluation apparatus.

Next, an example of process operations of the coke oven wall surface evaluation apparatus 300 is described with reference to a flowchart in FIG. 14. The flowchart in this FIG. 14 is carried out by the CPU provided at the coke oven wall surface evaluation apparatus 300 executing control programs stored in the ROM and the hard disk.

At first, the oven wall three-dimensional profile data deriving portion 301 stands by until the image signals of all over the oven walls 14R, 14L at the right side and left side of the coking chamber 11a, 11b are obtained by the wall surface observation apparatus 200, in step S1. When the image signals of all over the oven walls 14R, 14L at the right side and left side of the coking chamber 11a, 11b are obtained, the process goes to step S2.

In the step S2, the oven wall three-dimensional profile data deriving portion 301 derives the added oven wall three-dimensional profile data 701 of the oven walls 14R, 14L at the right side and left side of the coking chamber 11a, 11b (the oven wall three-dimensional profile data 701 of all over the oven walls 14R, 14L at the right side and left side of the coking chamber 11a, 11b) by adding the respective oven wall three-dimensional profile data 701 of the oven walls 14R, 14L at the right side and left side of the coking chamber 11a, 11b based on the image signals obtained by the wall surface observation apparatus 200 (refer to FIG. 7, FIG. 11).

Next, the region specifying portion 302 sets each of variables "i", "j" at "1", in step S3. The variables "i", "j" are stored in, for example, the RAM, a register, or the like provided at the coke oven wall surface evaluation apparatus 300.

Next, the step calculation portion 303 asks the step ΔZ at the region (i, j) based on the added oven wall three-dimensional profile data 701, in step S4 (refer to FIG. 9A and FIG. 9B).

Next, the local resistance index derivation determination portion 304 judges whether the step ΔZ asked in the step S4 is larger than the constant "δ" or not, in step S5. When the step ΔZ asked in the step S4 is larger than the constant "δ" as a result of this judgment, the process goes to later described step S14.

On the other hand, when the step ΔZ asked in the step S4 is not more than the constant "δ", the process goes to step S6. In the step S6, the local resistance index derivation determination portion 304 sets the local resistance index $k_{i,j}$ at the region (i, j) at "0" (zero).

Next, the local resistance index deriving portion 305 temporary stores the local resistance index $k_{i,j}$ set in the step S6, to the local resistance index storage portion 306, in step S7.

Next, the local resistance index derivation completion judging portion 307 judges whether the variable "i" is a prescribed value "p" or not, in step S8. The prescribed value "p" is a value defined by the number of the added oven wall three-dimensional profile data 701 in a crosswise direction (the direction from the PS side toward the CS side). When the variable "i" is not the prescribed value "p" as a result of this judgment, the process goes to step S9, and the region specifying portion 302 adds "1" to the variable "i". After that, the processes after the step S4 are performed again.

On the other hand, when the variable "i" is the prescribed value "p", the process goes to step S10. In the step S10, the local resistance index derivation completion judging portion 307 judges whether the variable "j" is a prescribed value "q" or not. The prescribed value "q" is a value defined by the number of the added oven wall three-dimensional profile data 701 in the longwise direction (the height direction). When the variable "j" is not the prescribed value "q" as a result of this judgment, the process goes to step S11, and the region specifying portion 302 adds "1" to the variable "j". After that the processes after the step S4 are performed again.

On the other hand, when the variable "j" is the prescribed value "q", it is judged that all of the local resistance indexes $k_{i,j}$ are derived, and the process goes to step S12. In the step S12, the resistance index determination portion 308 reads all of the local resistance indexes $k_{i,j}$ stored in the local resistance index storage portion 306 in the step S7, and derives the resistance index "k" from the read local resistance indexes $k_{i,j}$ by using the expression (2).

Next, the resistance index displaying portion 309 displays the resistance index "k" calculated in the step S12 on the display device 400, in step S13.

When it is judged that the step ΔZ asked in the step S4 is larger than the constant "δ" in the step S5, the process goes to the step S14. In the step S14, the local resistance index deriving portion 305 reads the local resistance index $k_{i,j}$ of the region (i−1, j), from the local resistance index storage portion 306, and judges whether the read local resistance index $k_{i-1,j}$ is "0" (zero) or not. When the local resistance index $k_{i-1,j}$ is "0" (zero) as a result of this judgment, the process goes to later-described step S16.

On the other hand, when the local resistance index $k_{i,j}$ is not "0" (zero), the process goes to step S15. In the step S15, the local resistance index deriving portion 305 reads the constants "α", "β", the weighting coefficients "ε", "γ", the length "$D_0$" in the depth direction of the coking chamber 11a, 11b, the height "$H_o$" of the coking chamber 11a, 11b, and a position "d", "h" defined by the region (i, j). The local resistance index deriving portion 305 calculates the local resistance index $k_{i,j}$ by substituting the read parameters and the local resistance index $k_{i-1,j}$ read in the step S14 into the expression (1). The process then goes to the above-stated step S7, and the local resistance index deriving portion 305 temporary stores the local resistance index $k_{i,j}$ calculated in the step S15.

The process goes to the step S16 when it is judged that the local resistance index $k_{i-1,j}$ is "0" (zero), in the step S14. In the step S16, the local resistance index deriving portion 305 reads the constants "α", "β", the weighting coefficients "ε", "γ", the length "$D_0$" in the depth direction of the coking chamber 11a, 11b, the height "$H_0$" of the coking chamber 11a, 11b, and the position "d", "h" defined by the region (i, j) as same as in the step S15. The local resistance index deriving portion 305 calculates the local resistance index $k_{i,j}$ by substituting the read parameters into the expression (1) and substituting "0" (zero) as the local resistance index $k_{i-1,j}$ into the expression (1). The process goes to the above-stated step S7, and the local resistance index deriving portion 305 temporary stores the local resistance index $k_{i,j}$ calculated in the step S16. Incidentally, when the process goes to the step S16, the constant "β" may not be read in the step S16 because the local resistance index $k_{i-1,j}$ is "0" (zero), and a second term at the right side of the expression (1) becomes "0" (zero).

Figure 15:
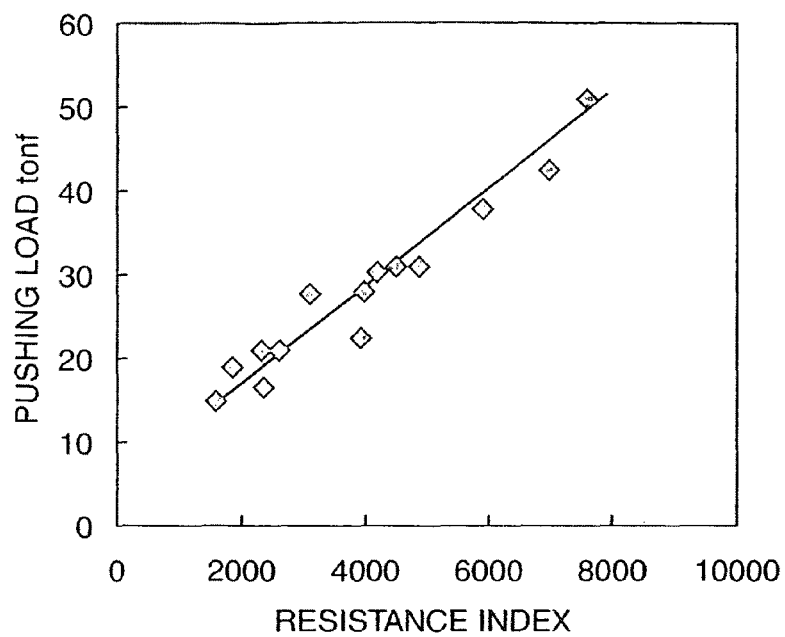
FIG. 15 illustrates the first embodiment, and is a view illustrating an example of a relationship between a resistance index and a pushing load.

FIG. 15 is a view illustrating a relationship between the resistance index "k" asked as stated above and the pushing load. The added oven wall three-dimensional profile data 701 is derived, and the resistance index "k" is calculated as stated above by using the added oven wall three-dimensional profile data 701, while selecting the coking chamber 11a, 11b having the other factors varying the pushing load such as a shortage of the coking time of the coke 15 as little as possible. On the other hand, the pushing load generated when the coke 15 is actually pushed from the coking chamber 11a, 11b is asked based on a measurement value of a torque meter attached to a motor shaft of the pusher ram 20. Specifically, the pushing load (force) is calculated from a torque measurement value and a speed reduction ratio of a pusher ram driving mechanism. Here, a point where the pushing load becomes the maximum value during the process of pushing the coke 15 is just called as the pushing load. A position corresponding to the resistance index "k" and the pushing load obtained as stated above is plotted. A lot of plots as illustrated in FIG. 15 can be obtained as a result of performing the process as stated above for many coking chambers 11a, 11b.

As stated above, there are various factors determining the pushing load, such as a composition of the coal, and the coking time. Accordingly, it is conventionally impossible to evaluate the degree of the influence of the concave and convex state of the oven wall 14 exerted on the pushing load while separating from the other factors. However, as illustrated in FIG. 15, it can be seen that clear correlation is obtained between the resistance index "k" and the pushing load (the pushing force). Namely, when the coking chamber 11a, 11b is diagnosed, it is possible to quantitatively evaluate and manage the state of the oven wall 14 affecting on the pushing load if the resistance index "k" is derived.

Figure 16:
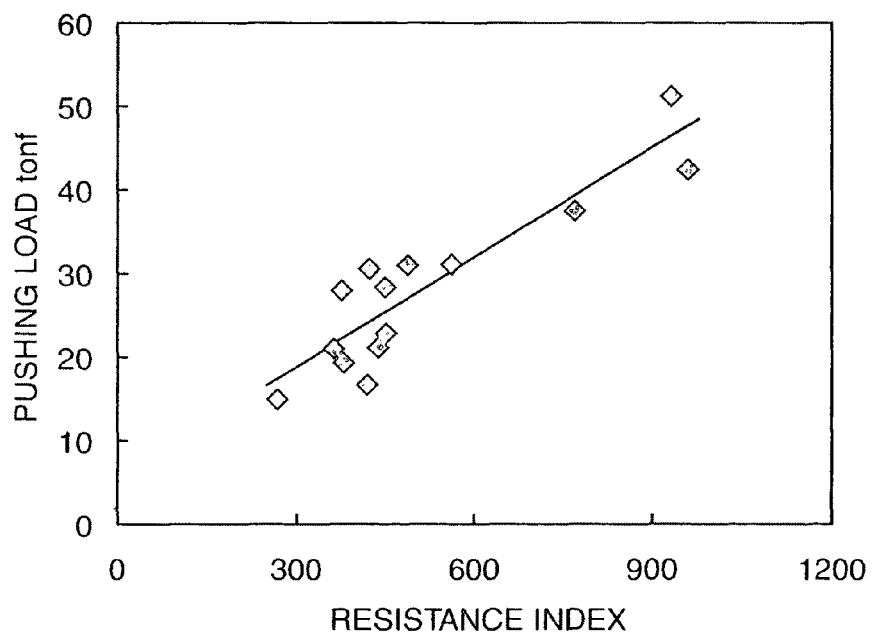
FIG. 16 illustrates the first embodiment, and is a view illustrating a relationship between the resistance index and the pushing load when the weighting coefficient is set at "0" (zero)

FIG. 16 is a view illustrating a relationship between the resistance index "k" and the pushing load when the weighting coefficient "γ" is set at "0" (zero). As illustrated in FIG. 16, the correlation can be seen between the resistance index "k" and the pushing load even if the weighting coefficient "γ" is not considered. However, a clearer correlation can be obtained between the resistance index "k" and the pushing load when the weighting coefficient "γ" is considered, as it can be seen by comparing FIG. 15 and FIG. 16. Consequently, it can be seen that it is preferable to ask the resistance index "k" in consideration of the weighting coefficient "γ".

Figure 17:
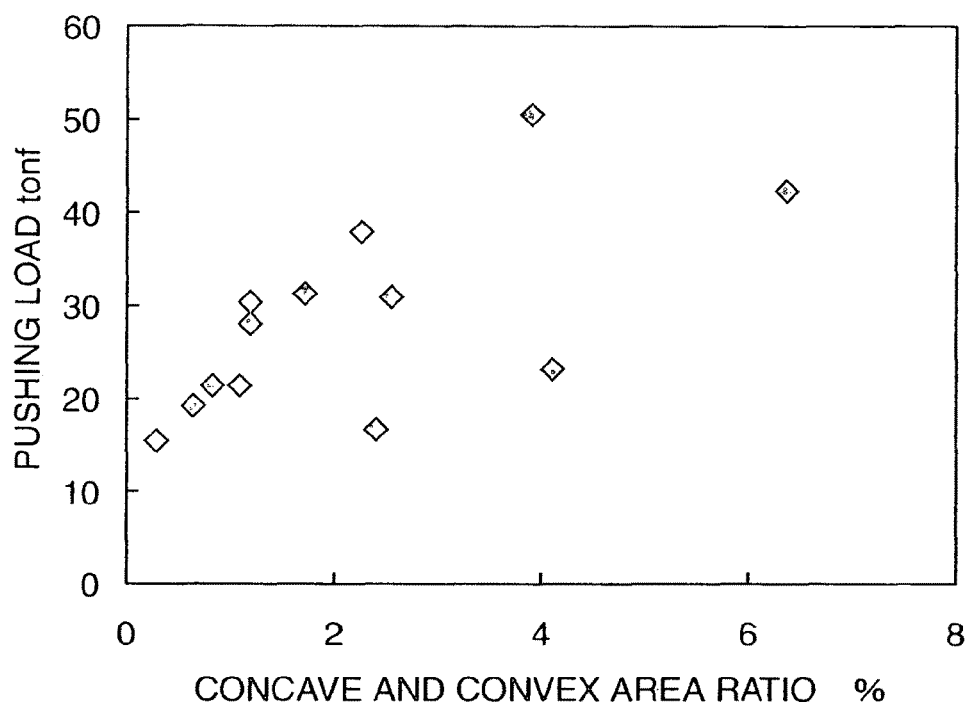
FIG. 17 illustrates the first embodiment, and is a view illustrating a relationship between a ratio of a region of which concave and convex amount of caves or projections generated on the oven wall of the coking chamber is 20 mm or more is occupying for all over the oven wall, and the pushing load.

Conventionally, the relationship between the state of the oven wall 14 of the coking chamber 11a, 11b and the pushing load has been investigated, but the method thereof is a simple one in which an area of the concaves and convexes generated on the oven wall 14 is made to be an index representing the state of the oven wall 14. For example, FIG. 17 is a view illustrating a relationship between a ratio of the regions, of which concave and convex amounts of caves or projections generated on the oven wall 14 of the coking chamber 11a, 11b are 20 mm or more occupies for all over the oven wall 14, and the pushing load. A concave and convex area ratio of a horizontal axis in FIG. 17 is a value in which a total value of the areas of the regions of which concave and convex amounts of the caves or the projections are 20 mm or more is divided by an area of all over the oven wall 14 of the coking chamber 11a, 11b, and thereafter, it is multiplied by 100. As illustrated in FIG. 17, a correlation between the area ratio and the pushing load clearly deteriorates compared to the correlation between the resistance index "k" and the pushing load illustrated in FIG. 15 and FIG. 16. The present inventors earnestly studied a physical phenomenon in which the oven wall concaves and convexes become the resistance at the time of the coke transfer, and devised to define the index called as the resistance index based on a model in which a resistance amount, namely, the pushing load depends on the shape or the position of the rising gradient of the concave and convex portion with which the coke is in contact. As a result, the clear correlation between the state of the oven wall 14 of the coking chamber 11a, 11b and the pushing load can be obtained for the first time.

As stated above, in the present embodiment, the added oven wall three-dimensional profile data 701 representing the concave and convex amounts on all over the oven walls 14R, 14L at the right side and left side of the coking chamber 11a, 11b is generated by using the image signals obtained by the wall surface observation apparatus 200. The resistance index "k", in which the resistance received by the pushed cokes 15 resulting from the rising gradient of the oven wall 14 is indexed is asked by using the added oven wall three-dimensional profile data 701. As a result, it can be verified that there is the correlation between the resistance index "k" and the pushing load.

Accordingly, it is possible to quantitatively evaluate the state of the oven wall 14 affecting on the pushing load, and to evaluate and manage the concave and convex state of the oven wall 14 of the coking chamber 11a, 11b from a point of view of the pushing capability of the coke 15, which is one of the most important point in an operation of an iron and steel manufacturing process. Further, it is possible to quantitatively determine a necessity of operation actions such as a lowering of the pushing load by decreasing the amount of the coal charged into the coking chamber 11a, 11b, or a lowering of the pushing load by extending a soaking time, based on the resistance index "k". For example, it is possible to decrease the amount of the coal to be charged into the coking chamber 11a, 11b according to the value of the resistance index "k", when the resistance index "k" exceeds a threshold value.

As for the oven wall of which concaves and convexes are remarkable, there is a case when a repair recovering a smooth surface is performed by padding the concave portion by a flame gunning, scraping the bricks of the convex portion, or the like. However, the repair work of the oven wall requires great time and work, and it is forced to decrease the production of the coke 15. Accordingly, a usage of the resistance index described in the present embodiment is effective as the index objectively determining the necessity of the repair.

As a result, it is possible to prevent the deterioration of the productivity of the coke 15, because it is possible to prevent that the amount of the coal to be charged into the coking chamber 11a, 11b is decreased too much or the soaking time is set to be too long, in addition to prevent the occurrence of the clogging of the coke 15 in the coking chamber 11a, 11b.

Besides, in the present embodiment, when the local resistance indexes $k_{i,j}$ in which the resistances generated by the contact (catching) of the coke 15 with the rising gradient of the oven wall 14 seen from the pushing direction of the coke 15 are indexed as for the respective regions of the oven wall 14 are derived, the local resistance index $k_{i-1,j}$ of the region adjacent thereto at the pushing source side of the coke 15 is considered. Consequently, for example, it is possible to make the resistance indexes "k" different between a case when the region of the rising gradient and the region of the falling gradient exist alternately and a case when the regions of the rising gradient continue. Accordingly, it becomes possible to reflect the actual state of the concaves and convexes on the resistance index "k", and to further improve the accuracy of the resistance index "k". A graphic chart representing the relationship between the resistance index "k" and the pushing load (the graphic chart illustrated in FIG. 15) can be therefore derived more accurately. Accordingly, it is possible to further improve reliability of an estimated value of the pushing load.

Further, in the present embodiment, the local resistance index $k_{i,j}$ is derived by performing the weighting in accordance with the position where the local resistance indexes $k_{i,j}$ is to be derived. Specifically, the weighting of the local resistance index $k_{i,j}$ is performed by using the weighting coefficient "ε" such that the local resistance index $k_{i,j}$ becomes large as the local resistance index $k_{i,j}$ of the region exists at a position getting away from the pushing source side of the coke 15. Besides, the weighting of the local resistance index $k_{i,j}$ is performed by using the weighting coefficient "γ" such that the local resistance index $k_{i,j}$ becomes large as the local resistance index $k_{i,j}$ of the region exists at a position low in height. Consequently, it becomes possible to reflect the force received by the coke 15 from the pusher ram 20 on the resistance index "k", and thereby, the accuracy of the resistance index "k" can be more improved. Accordingly, it is possible to derive the graphic chart representing the relationship between the resistance index "k" and the pushing load (the graphic chart illustrated in FIG. 15) more accurately. It is therefore possible to further improve the reliability of the estimated value of the pushing load.

Besides, in the present embodiment, the concave and convex amounts on all over the oven walls 14R, 14L at the right side and left side of the coking chamber 11a, 11b are added between the regions facing with each other, and the added concave and convex amounts (z(1, 1) to z(p, q)) are made to be the added oven wall three-dimensional profile data 701. Consequently, it is possible to reduce a calculation load when the resistance index "k" is derived. Accordingly, it is possible to further reduce a load when the graphic chart representing the relationship between the resistance index "k" and the pushing load (the graphic chart illustrated in FIG. 15) is created.

Besides, in the above-stated Patent Document 1, the distance between the oven walls in the depth direction of the coking chamber is just measured at a certain height of the coking chamber, and therefore, it is impossible to grasp the concaves and convexes existing at the height different from the measured height. Accordingly, in the art described in the Patent Document 1, it is impossible to accurately grasp the state of the oven walls 14R, 14L at the right side and left side of the coking chamber 11a, 11b. In contrast, in the present embodiment, the concave and convex amounts on all over the oven walls 14R, 14L at the right side and left side of the coking chamber 11a, 11b are asked from the image signals photographed by the wall surface observation apparatus 200, and therefore, it is possible to derive the resistance index "k" while accurately reflecting the state of the oven walls 14R, 14L at the right side and left side of the coking chamber 11a, 11b. Accordingly, it is possible to derive the graphic chart representing the relationship between the resistance index "k" and the pushing load (the graphic chart illustrated in FIG. 15) more accurately. It is therefore possible to further improve the reliability of the estimated value of the pushing load.

Incidentally, in the present embodiment, the resistance index "k" is asked by using the expression (1) and the expression (2), but the resistance index "k" is not necessarily asked by using the expression (1) and the expression (2). Namely, the resistance index "k" is not necessarily asked by using the expression (1) and the expression (2) as long as it is an index value in which the resistance received by the pushed coke 15 resulting from the rising gradient of the oven wall 14 is indexed.

Besides, the concave and convex amounts on all over the oven walls 14R, 14L at the right side and left side of the coking chamber 11a, 11b are added between the regions facing with each other, and the added concave and convex amounts (z(1, 1) to z(p, q)) are made to be the added oven wall three-dimensional profile data 701 as stated above, it is preferable because the calculation load can be reduced. However, the oven wall three-dimensional profile data are calculated for the respective oven walls 14R, 14L at the right side and left side of the coking chamber 11a, 11b, and the local resistance indexes $k_{i,j}$ and the resistance indexes "k" may be asked by using these two oven wall three-dimensional profile data.

Besides, the local resistance index $k_{i,j}$ is derived by performing the weighting in accordance with the position to be the deriving object of the local resistance index $k_{i,j}$ as in the present embodiment, it is preferable because the resistance indexes "k" can be asked more accurately. However, the local resistance indexes $k_{i,j}$ may be derived without performing the weighting in accordance with the positions to be the deriving objects of the local resistance indexes $k_{i,j}$. For example, the local resistance index $k_{i,j}$ may be derived while at least either one of the weighting coefficients "ε", "γ" is set at "0" (zero).

Besides, the weighting coefficients "ε", "γ" do not necessarily change linearly. For example, the weighting coefficients "ε", "γ" may change exponentially.

Besides, it is preferable if the concave and convex amounts on all over the oven walls 14R, 14L at the right side and left side of the coking chamber 11a, 11b are asked from the image signals photographed by the wall surface observation apparatus 200, as in the present embodiment, because the oven walls 14R, 14L at the right side and left side of the coking chamber 11a, 11b can be evaluated more accurately. However, it is not necessarily required to ask the concave and convex amounts on all over the oven walls 14R, 14L at the right side and left side of the coking chamber 11a, 11b from the image signals photographed by the wall surface observation apparatus 200.

Besides, a part or all of the imaging processes performed by the wall surface observation apparatus 200 may be performed by the coke oven wall surface evaluation apparatus 300.

Besides, in the present embodiment, it is set that the constant "δ" has a value larger than "0" (zero), but the constant "δ" may be set at "0" (zero).

Besides, in the present embodiment, the interval to obtain the image signals in the depth direction of the coking chamber 11a, 11b is determined based on a surface property of the coke block 15C of which length in the depth direction of the coking chamber 11a, 11b is the minimum, but it is not necessarily determined as stated above. For example, the interval to obtain the image signals in the depth direction of the coking chamber 11a, 11b may be determined based on the surface property of the coke block of which length in the depth direction of the coking chamber 11a, 11b is an average value (or a representative value) among all coke blocks.

Second Embodiment

Next, a second embodiment is described. In the present embodiment, the resistance indexes "k" are asked for the plural coking chambers 11a, 11b as in the first embodiment, and repair of the oven wall 14 is simulated while bringing the asked resistance indexes "k" into correspondence with the pushing loads generated in the plural coking chambers 11a, 11b. As stated above, in the present embodiment, the repair of the oven wall 14 of the coking chamber 11a, 11b is supported by using the resistance index "k" asked as in the first embodiment. Accordingly, in the description of the present embodiment, the detailed descriptions of the same portion as the above-stated first embodiment are not given.

Figure 18:
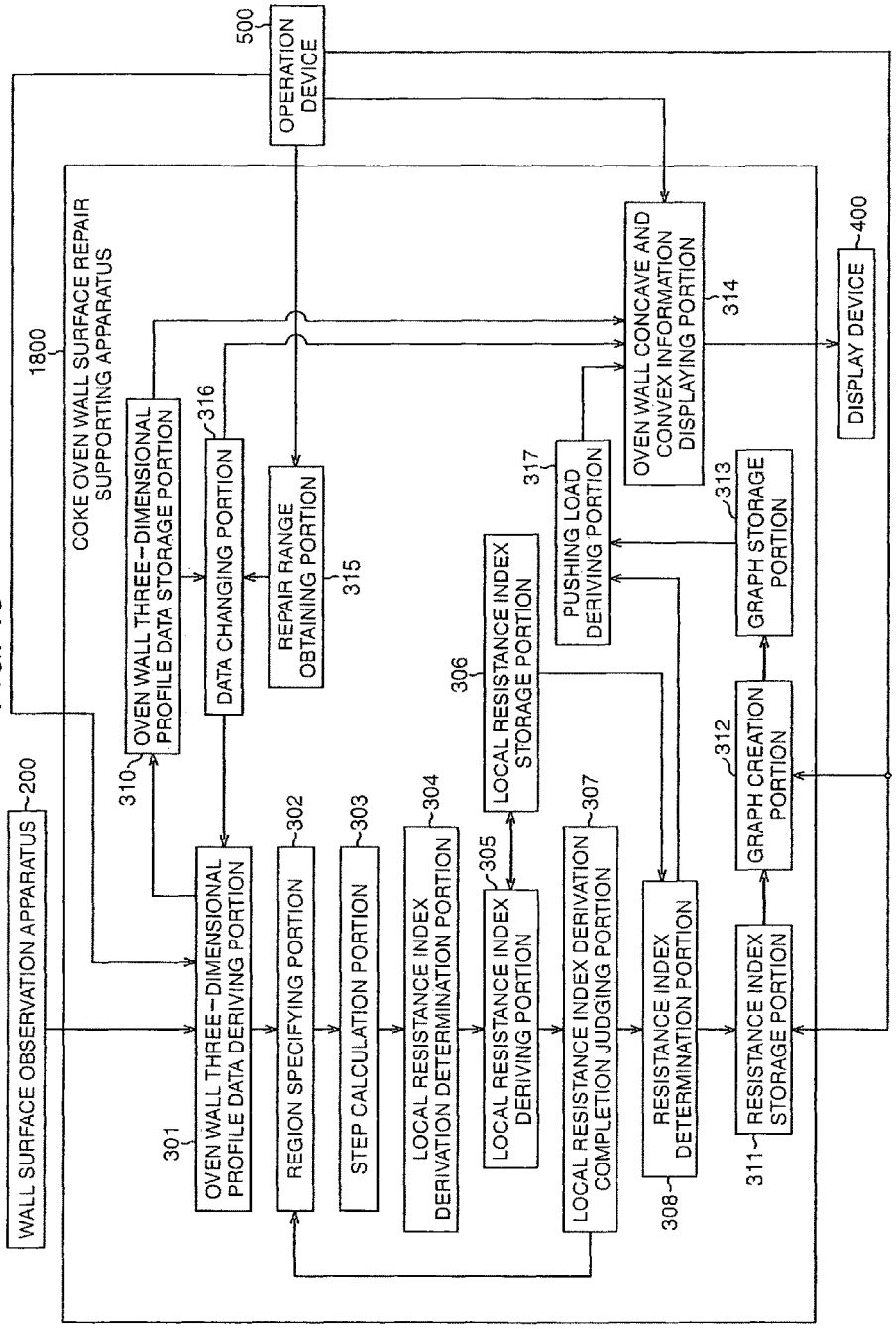
FIG. 18 illustrates a second embodiment, and is a view illustrating an example of a functional configuration of a coke oven wall surface repair supporting apparatus.

FIG. 18 is a view illustrating an example of a functional configuration of a coke oven wall surface repair supporting apparatus. Incidentally, hardware of a coke oven wall surface repair supporting apparatus 1800 is, for example, an apparatus such as a personal computer including a CPU, a ROM, a RAM, a hard disk, and an image input/output board. Each block illustrated in FIG. 18 can be carried out by, for example, the CPU executing control programs stored in the ROM and the hard disk by using the RAM.

The coke oven wall surface repair supporting apparatus 1800 performs the following three processes when divided roughly. Namely, a resistance index deriving process deriving the resistance index "k" being an example of a resistance index in which a resistance received by coke from a rising gradient relative to a pushing direction of the coke at the pushing time is indexed, a resistance index and pushing load corresponding process bringing the plural resistance indexes "k" in the plural coking chambers 11a, 11b into correspondence with the pushing loads generated at the plural coking chambers 11a, 11b, and a repair simulation process simulating the repair of the oven wall 14 are performed. Accordingly, hereinafter, respective blocks illustrated in FIG. 18 are described by each of these three processes.

(Resistance Index Deriving Process)

The oven wall three-dimensional profile data deriving portion 301 performs the following processes in addition to the contents described in the first embodiment. Namely, the oven wall three-dimensional profile data deriving portion 301 derives the respective oven wall three-dimensional profile data of the oven walls 14R, 14L at the right side and left side of the coking chamber 11a, 11b based on the image signals obtained by the wall surface observation apparatus 200, and then stores the derived oven wall three-dimensional profile data into an oven wall three-dimensional profile data storage portion 310 provided by, for example, a hard disk. At this time, the oven wall three-dimensional profile data deriving portion 301 stores the derived oven wall three-dimensional profile data into the oven wall three-dimensional profile data storage portion 310 while making the derived oven wall three-dimensional profile data identifiable to which coking chamber 11a, 11b of which coke oven 100 the data belongs based on an operation by a user of an operation device 500 including a keyboard, a mouse, and so on. The reason why the oven wall three-dimensional profile data is stored as stated above is to enable the user to specify a repair portion at the respective oven walls 14R, 14L at the right side and left side of the coking chamber 11a, 11b, as it is described later.

Incidentally, in the present embodiment, the oven wall three-dimensional profile data 701 obtained by adding the concave and convex amounts on all over the oven walls 14R, 14L at the right side and left side of the coking chamber 11a, 11b between the regions facing with each other is called as the added oven wall three-dimensional profile data 701 according to need.

As stated above, in the present embodiment, the oven wall three-dimensional profile data 701 is used as the concave and convex information, and a concave and convex information deriving unit and a concave and convex information storage unit are provided by using the oven wall three-dimensional profile data deriving portion 301.

Besides, the resistance index determination portion 308 performs the following processes in addition to the contents described in the first embodiment. Namely, the resistance index determination portion 308 stores the resistance index "k" derived by using the above-stated expression (1) and expression (2) into a resistance index storage portion 311 provided by, for example, a hard disk. At this time, the resistance index determination portion 308 stores the derived resistance index "k" into the resistance index storage portion 311 while making the derived resistance index "k" identifiable to which coking chamber 11a, 11b of which coke oven 100 it belongs based on the operation of the operation device 500 by the user. Incidentally, in the present embodiment, the resistance indexes "k" are derived as for the plural coking chamber 11a, 11b in the plural coke ovens 100, and they are stored into the resistance index storage portion 311.

(Resistance Index and Pushing Load Corresponding Process)

In the present embodiment, the pushing load generated when the coke 15 is actually taken out of the coking chamber 11a, 11b of which resistance index "k" is derived as stated above, is measured based on the measurement value of the torque meter attached to the motor shaft of the pusher ram 20. The user inputs the measurement value (the pushing load) by using the operation device 500 while making the measurement value identifiable to which coking chamber 11a, 11b of which coke oven 100 the measurement value belongs. The user performs this input operation for the plural (preferably, for all) resistance indexes "k" stored in the resistance index storage portion 311.

Figure 19:
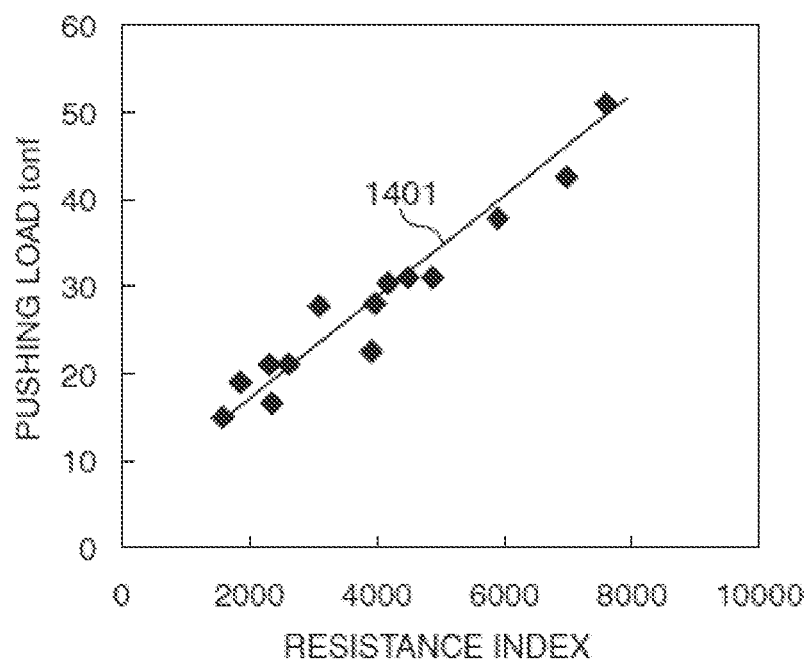
FIG. 19 illustrates the second embodiment, and is a view illustrating an example of a relationship between a resistance index and a pushing load.

A graph creation portion 312 reads the resistance index "k" of the coking chamber 11a, 11b which is the same as the coking chamber 11a, 11b of which pushing load inputted as stated above is measured from the resistance index storage portion 311. The graph creation portion 312 plots a position corresponding to the pushing load inputted from the operation device 500 as stated above and the resistance index "k" read from the resistance index storage portion 311, as illustrated in FIG. 19. The plot as stated above is performed for the plural (preferably, for all) resistance indexes "k" stored in the resistance index storage portion 311. A graphic chart 1401 representing a relationship between the pushing load and the resistance index "k" is created based on these plotted results.

More specifically, the coking chamber 11a, 11b having the other factors varying the pushing load such as a shortage of the coking time of the coke 15 as little as possible is selected, the added oven wall three-dimensional profile data 701 is derived, and the resistance index "k" is calculated as stated above by using the added oven wall three-dimensional profile data 701 to create the graphic chart 1401 illustrated in FIG. 19. Meanwhile, the pushing load generated when the coke 15 is actually taken out of the coking chamber 11*a*, 11*b* is asked based on the measurement value of the torque meter attached to the motor shaft of the pusher ram 20. Specifically, the pushing load (force) is calculated from the torque measurement value and the speed reduction ratio of the pusher ram driving mechanism. Here, the point where the pushing load becomes the maximum value during the process of pushing the coke 15 is just called as the pushing load. The position corresponding to the resistance index "k" and the pushing load obtained as stated above is plotted. A lot of plots can be obtained as illustrated in FIG. 19, as a result of performing the processes as stated above for a lot of coking chamber 11*a*, 11*b*.

The graph creation portion 312 stores the graphic chart 1401 created as stated above into a graph storage portion 313 provided by, for example, a hard disk.

As stated above, in the present embodiment, a pushing load measurement value obtaining unit and a relationship deriving unit are provided by using the graph creation portion 312. Besides, in the present embodiment, resistance index pushing load correlation information is provided by using the graphic chart 1401.

(Repair Simulation Process)

Figure 20:
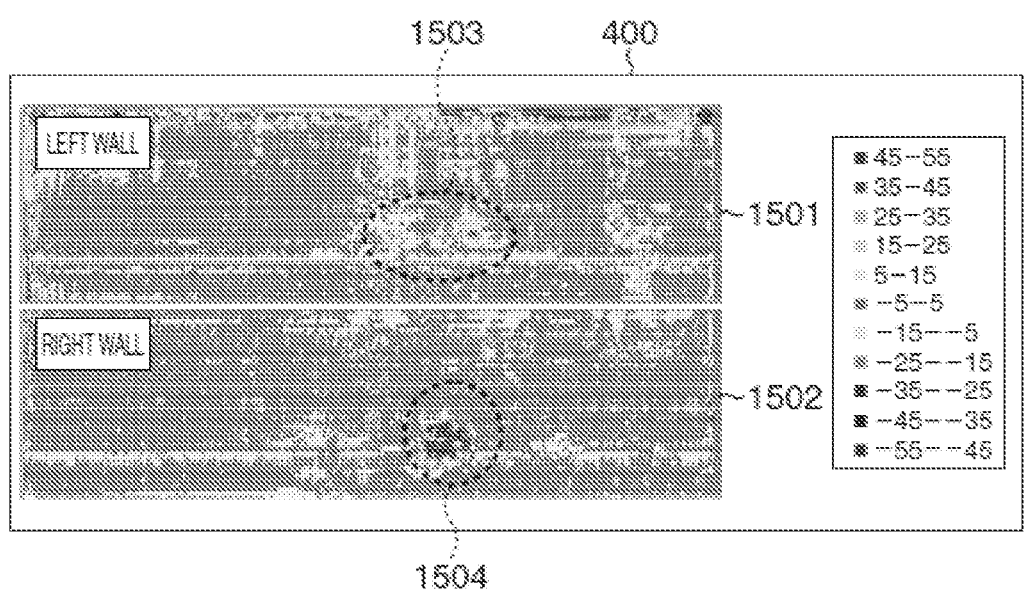
FIG. 20 illustrates the second embodiment, and is a view illustrating an example of "respective oven wall three dimensional profile data of the oven walls at a right side and left side of a coking chamber" displayed on a display device before a repair simulation is started.

An oven wall concave and convex information displaying portion 314 reads the oven wall three-dimensional profile data for the coking chamber 11*a*, 11*b* of the coke oven 100 from the oven wall three-dimensional profile data storage portion 310 and displays on the display device 400, when the coke oven 100 and the coking chamber 11*a*, 11*b* being a repair object is indicated based on the operation of the operation device 500 by the user. FIG. 20 is a view illustrating an example of "the respective oven wall three-dimensional profile data of the oven walls 14R, 14L at the right side and left side of the coking chamber 11*a*, 11*b*" displayed on the display device 400 before the repair simulation is started. Incidentally, the resistance index "k" derived from an oven wall three-dimensional profile data 1501 of the oven wall 14L at the left side and an oven wall three-dimensional profile data 1502 of the oven wall 14R at the right side illustrated in FIG. 20 is "10500", and an actual measured value of the pushing load is 55 [tonf].

As stated above, in the present embodiment, a concave and convex information displaying unit is provided by using the oven wall concave and convex information displaying portion 314.

A repair range obtaining portion 315 obtains repair object regions 1503, 1504 specified for the oven wall three-dimensional profile data 1501, 1502 based on the operation of the operation device 500 by the user.

A data changing portion 316 changes the data of the concave and convex amount included in the repair object regions 1503, 1504 obtained by the repair range obtaining portion 315 into, for example, "0" (zero) as an example of a repair value. Incidentally, the repair value is a target value of the concave and convex amount after the repair.

As stated above, in the present embodiment, a concave and convex information changing unit is provided by using the data changing portion 316.

The oven wall three-dimensional profile data deriving portion 301 adds the oven wall three-dimensional profile data 1501, 1502 of which data are changed as stated above, and outputs the added oven wall three-dimensional profile data to the region specifying portion 302, when the data of the concave and convex amount included in the repair object regions 1503, 1504 are changed by the data changing portion 316.

The region specifying portion 302, the step calculation portion 303, the local resistance index derivation determination portion 304, the local resistance index deriving portion 305, the local resistance index derivation completion judging portion 307, and the resistance index determination portion 308 perform the above-stated processes for the added oven wall three-dimensional profile data of which data are changed by the data changing portion 316. Accordingly, the resistance index "k" for the oven wall three-dimensional profile data of which data is changed by the data changing portion 316 is derived.

A pushing load deriving portion 317 derives the pushing load corresponding to the resistance index "k" from "the graphic chart 1401 representing the relationship between the pushing load and the resistance index "k"" stored in the graph storage portion 313, when the resistance index "k" for the added oven wall three-dimensional profile data of which data is changed by the data changing portion 316 is derived by the resistance index determination portion 308.

As stated above, in the present embodiment, a pushing load deriving unit is provided by using the pushing load deriving portion 317.

The oven wall concave and convex information displaying portion 314 displays the oven wall three-dimensional profile data of which data is changed by the data changing portion 316, the resistance index "k" obtained from the oven wall three-dimensional profile data, and the pushing load on the display device 400.

Figure 21A:
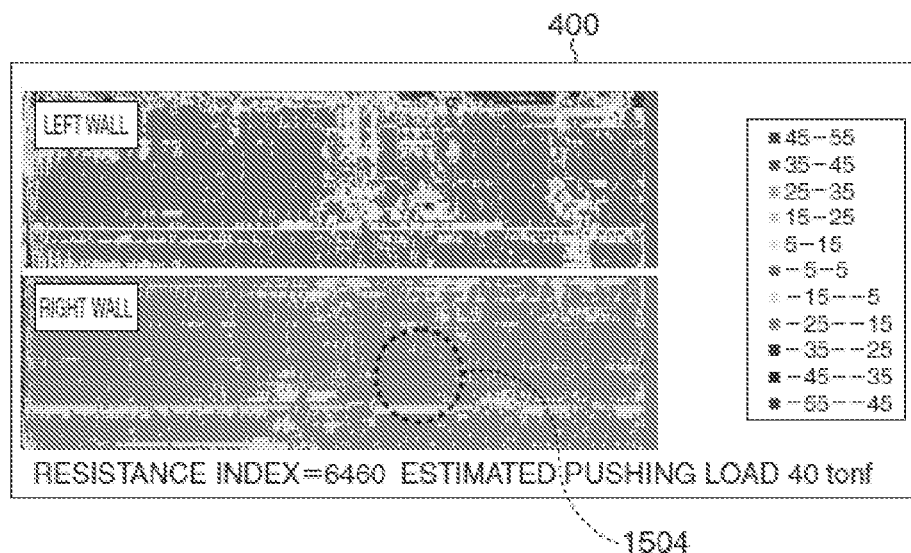
FIG. 21A illustrates the second embodiment, and is a view illustrating a display example when a data of an concave and convex amount inside a repair object region illustrated in FIG. 20 is changed.
Figure 21B:
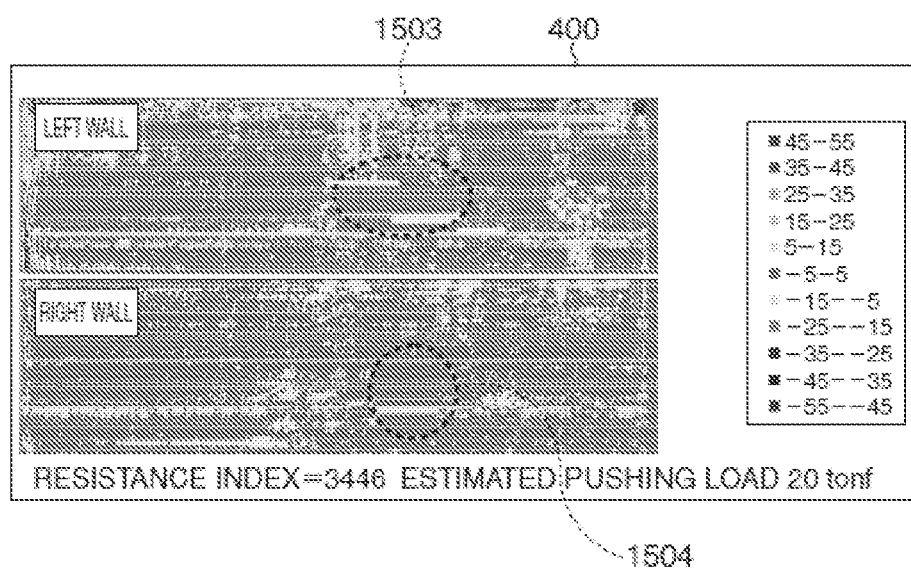
FIG. 21B illustrates the second embodiment, and is a view illustrating a display example when the data of the concave and convex amount inside repair object regions illustrated in FIG. 20 are changed.

FIG. 21A and FIG. 21B are views illustrating display examples of the oven wall three-dimensional profile data of which data of the concave and convex amount is changed by the data changing portion 316, the resistance index "k" obtained from the oven wall three-dimensional profile data, and the pushing load estimated from the resistance index "k". Specifically, FIG. 21A is the display example when the data of the concave and convex amount inside the repair object region 1504 illustrated in FIG. 20 is changed, and FIG. 21B is the display example when the data of the concave and convex amount inside the repair object regions 1503, 1504 illustrated in FIG. 20 are changed.

As illustrated in FIG. 21A, when only the repair object region 1504 is repaired, the pushing load (calculated value) becomes 40 [tonf]. The pushing load is approximately 20 [tonf] in the coking chamber 11*a*, 11*b* of which pushing load is small, namely, of which oven wall is sound as it can be seen from FIG. 19, and therefore, the pushing load of 40 [tonf] is still in high level. Accordingly, there is a possibility of clogging of the coke 15 in the coking chamber 11*a*, 11*b* where the pushing load of 40 [tonf] is generated. On the other hand, when the repair object regions 1503, 1504 are repaired, as illustrated in FIG. 21B, the pushing load (calculated value) becomes 20 [tonf], and the coking chamber 11*a*, 11*b* is qualified as sound.

As stated above, in the present embodiment, when the repair object regions 1503, 1504 are specified for the oven wall three-dimensional profile data 1501, 1502 illustrated in FIG. 20, the resistance index "k" when the repair object regions 1503, 1504 are repaired is calculated, and the pushing load can be estimated from the calculated resistance index "k". As illustrated in FIG. 19, there is a clear correlation between the resistance index "k" and the pushing load, and therefore, the reliability of the estimated pushing load becomes extremely high. Accordingly, the user can easily and accurately judge the necessity of the repair, or the repair object regions 1503, 1504 to be repaired to get high efficiency, based on the estimated value (calculated value) of the pushing load. Incidentally, the present inventors repair the oven wall 14 according to the result of the repair simulation process illustrated in FIG. 21A and FIG. 21B, and confirm that the measurement value of the pushing load of the oven wall 14 after the repair is approximately the same as the result of the repair simulation process.

Figure 22:
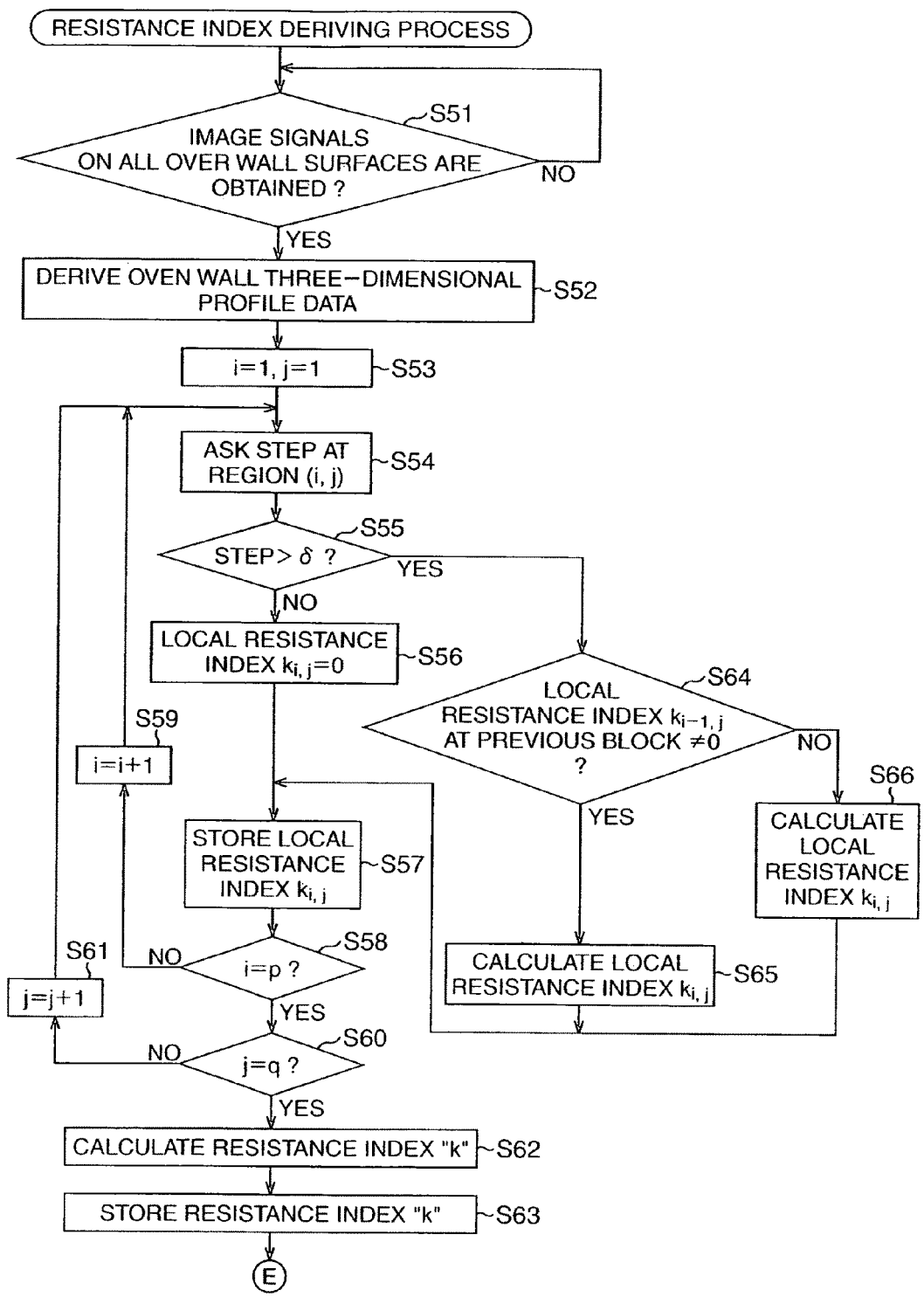
FIG. 22 illustrates the second embodiment, and is a flowchart explaining an example of a resistance index deriving process of the coke oven wall surface repair supporting apparatus.

Next, an example of the resistance index deriving process of the coke oven wall surface repair supporting apparatus 1800 is described with reference to a flowchart in FIG. 22. The flowchart in FIG. 22 is carried out by a CPU provided at the coke oven wall surface repair supporting apparatus 1800 executing control programs stored in a ROM and a hard disk.

At first, the oven wall three-dimensional profile data deriving portion 301 stands by until the image signals of all over the oven walls 14R, 14L at the right side and left side of the coking chamber 11a, 11b are obtained by the wall surface observation apparatus 200, in step S51. When the image signals of all over the oven walls 14R, 14L at the right side and left side of the coking chamber 11a, 11b are obtained, the process goes to step S52.

In the step S52, the oven wall three-dimensional profile data deriving portion 301 derives the respective oven wall three-dimensional profile data 1501, 1502 of the oven walls 14R, 14L at the right side and left side of the coking chamber 11a, 11b, based on the image signals obtained by the wall surface observation apparatus 200. The oven wall three-dimensional profile data deriving portion 301 stores the derived oven wall three-dimensional profile data 1501, 1502 into the oven wall three-dimensional profile data storage portion 310. Besides, the oven wall three-dimensional profile data deriving portion 301 adds the respective oven wall three-dimensional profile data 1501, 1502 of the oven walls 14R, 14L at the right side and left side of the coking chamber 11a, 11b, and derives the added oven wall three-dimensional profile data 701 of the oven walls 14R, 14L at the right side and left side of the coking chamber 11a, 11b (refer to FIG. 7, FIG. 11).

Next, the region specifying portion 302 sets each of the variables "i", "j" at "1" in step S53. The variables "i", "j" are stored in, for example, the RAM, the register, and so on provided at the coke oven wall surface repair supporting apparatus 1800.

Next, the step calculation portion 303 asks the step $\Delta Z$ at the region (i, j) based on the oven wall three-dimensional profile data 701 in step S54 (refer to FIG. 9).

Next, the local resistance index derivation determination portion 304 judges whether the step $\Delta Z$ asked in the step S54 is larger than the constant "$\delta$" or not in step S55. As a result of this judgment, when the step $\Delta Z$ asked in the step S54 is larger than the constant "$\delta$", the process goes to later-described step S64.

On the other hand, when the step $\Delta Z$ asked in the step S54 is not more than the constant "$\delta$", the process goes to step S56. In the step S56, the local resistance index derivation determination portion 304 sets the local resistance index $k_{i,j}$ in the region (i, j) as "0" (zero).

Next, the local resistance index deriving portion 305 temporary stores the local resistance index set in the step S56 into the local resistance index storage portion 306, in step S57.

Next, in step S58, the local resistance index derivation completion judging portion 307 judges whether the variable "i" is the prescribed value "p" or not. The prescribed value "p" is a value defined by the number of the added oven wall three-dimensional profile data 701 in the crosswise direction (the direction from the PS side toward the CS side). As a result of this judgment, when the variable "i" is not the prescribed value "p", the process goes to step S59, and the region specifying portion 302 adds "1" to the variable "i". After that, the processes after the step S54 are performed again.

On the other hand, when the variable "i" is the prescribed value "p", the process goes to step S60. In the step S60, the local resistance index derivation completion judging portion 307 judges whether the variable "j" is the prescribed value "q" or not. The prescribed value "q" is a value defined by the number of the added oven wall three-dimensional profile data 701 in the lengthwise direction (the height direction). As a result of this judgment, when the variable "j" is not the prescribed value "q", the process goes to step S61, and the region specifying portion 302 adds "1" to the variable "j". After that, the processes after the step S54 are performed again.

On the other hand, when the variable "j" is the prescribed value "q", it is judged that all of the local resistance indexes $k_{i,j}$ are derived, and the process goes to step S62. In the step S62, the resistance index determination portion 308 reads all of the local resistance indexes $k_{i,j}$ stored in the local resistance index storage portion 306 in the step S57, and derives the resistance index "k" by using the expression (2) from the read local resistance indexes $k_{i,j}$.

Next, the resistance index displaying portion 309 stores the resistance index "k" calculated in the step S61 into the resistance index storage portion 311 while making the resistance index "k" identifiable to which coking chamber 11a, 11b of which coke oven 100 it belongs, in step S63.

In the step S55, when it is judged that the step $\Delta Z$ asked at the step S54 is larger than the constant "$\delta$", the process goes to the step S64. In the step S64, the local resistance index deriving portion 305 reads the local resistance index $k_{i-1,j}$ of the region (i−1, j) from the local resistance index storage portion 306, and judges whether the read local resistance index $k_{i-1,j}$ is "0" (zero) or not. As a result of this judgment, when the local resistance index $k_{i-1,j}$ is "0" (zero), the process goes to later-described step S66.

On the other hand, when the local resistance index $k_{i-1,j}$ is not "0" (zero), the process goes to step S65. In the step S65, the local resistance index deriving portion 305 reads the constants "$\alpha$", "$\beta$", the weighting coefficients "$\epsilon$", "$\gamma$", the length "$D_0$" in the depth direction of the coking chamber 11a, 11b, the height "$H_0$" of the coking chamber 11a, 11b, and the position "d", "h" defined by the region (i, j). The local resistance index deriving portion 305 substitutes the read parameters and the local resistance index $k_{i-1,j}$ read in the step S64 into the expression (1) to calculate the local resistance index $k_{i,j}$. The process then goes to the above-stated step S57, and the local resistance index deriving portion 305 temporary stores the local resistance index $k_{i,j}$ calculated in the step S65.

When it is judged that the local resistance index $k_{i-1,j}$ is "0" (zero) in the step S64, the process goes to the step S66. In the step S66, the local resistance index deriving portion 305 reads the constants "$\alpha$", "$\beta$", the weighting coefficients "$\epsilon$", "$\gamma$", the length "$D_0$" in the depth direction of the coking chamber 11a, 11b, the height "$H_0$" of the coking chamber 11a, 11b, and the position "d", "h" defined by the region (i, j) as same as in the step S65. The local resistance index deriving portion 305 substitutes the read parameters into the expression (1), and substitutes "0" (zero) into the expression (1) as the local resistance index $k_{i-1,j}$, to calculate the local resistance index $k_{i,j}$. The process goes to the above-stated step S57, and the local resistance index deriving portion 305 temporary stores the local resistance index $k_{i,j}$ calculated in the step S66. Incidentally, when the process goes to the step S66, the local resistance index $k_{i-1,j}$ is "0" (zero), and the second term at the right side of the expression (1) becomes "0" (zero). Accordingly, the constant "$\beta$" may not be read in this step S64.

Figure 23:
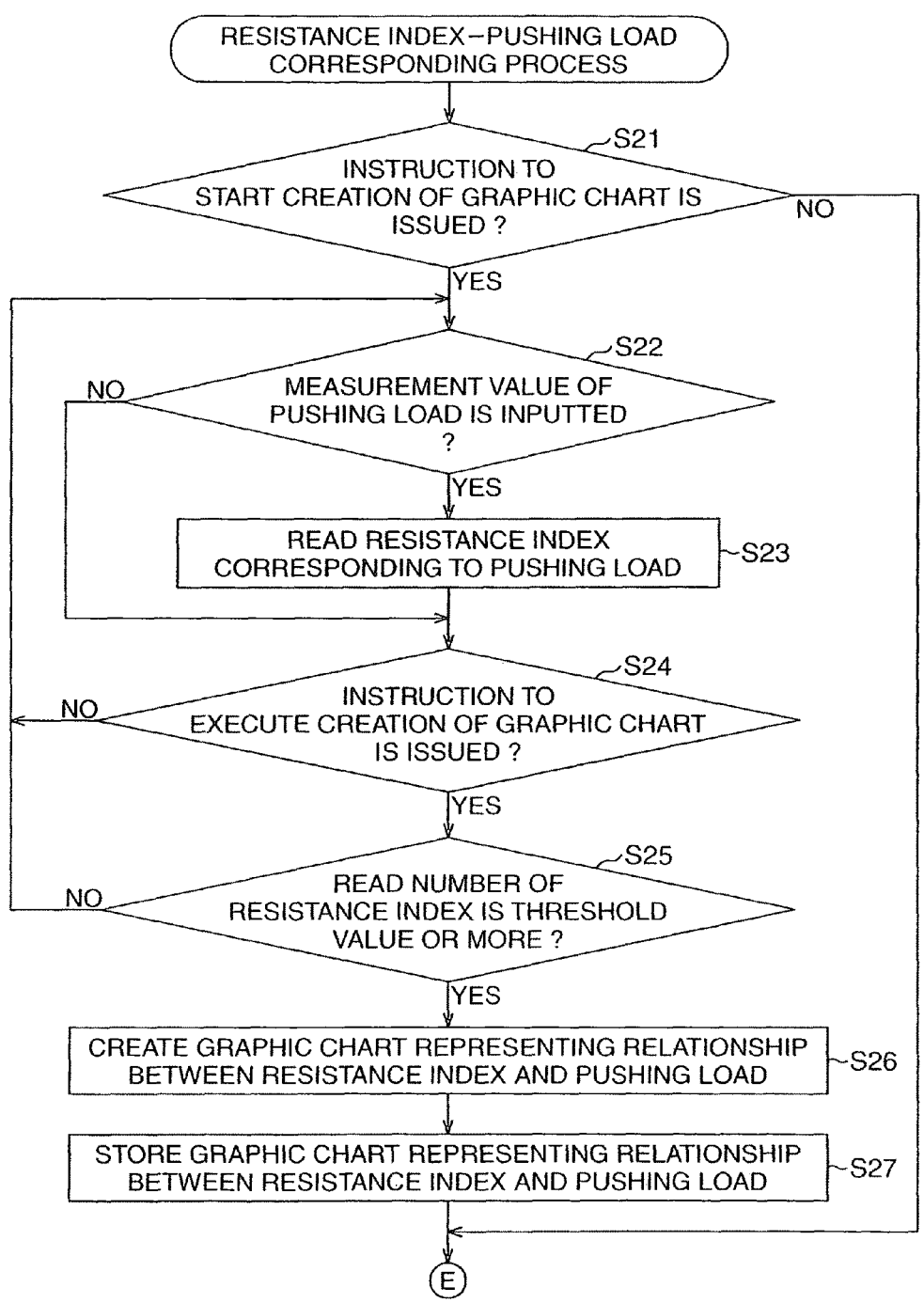
FIG. 23 illustrates the second embodiment, and is a flowchart explaining an example of a resistance index-pushing load corresponding process of the coke oven wall surface repair supporting apparatus.

Next, an example of the resistance index and the pushing load corresponding process of the coke oven wall surface repair supporting apparatus 1800 is described with reference to a flowchart in FIG. 23. This flowchart in FIG. 23 is carried out by the CPU provided at the coke oven wall surface repair supporting apparatus 1800 executing control programs stored in the ROM, and the hard disk.

At first, in step S21, the graph creation portion 312 judges whether an instruction to start the creation of the graphic chart 1401 representing the relationship between the pushing load and the resistance index "k" is issued or not. As a result of this judgment, when the instruction to start the creation of the graphic chart 1401 representing the relationship between the pushing load and the resistance index "k" is not issued, the flowchart in FIG. 23 is finished.

On the other hand, when the instruction to start the creation of the graphic chart 1401 representing the relationship between the pushing load and the resistance index "k" is issued, the process goes to step S22. In the step S22, the graph creation portion 312 judges whether the information of the measurement value of the pushing load and the information representing to which coking chamber 11*a*, 11*b* of which coke oven 100 the measurement value belongs are inputted or not. As a result of this judgment, when the information of the measurement value of the pushing load and the information representing to which coking chamber 11*a*, 11*b* of which coke oven 100 the measurement value belongs are not inputted, the process goes to later-described step S24.

On the other hand, when the information of the measurement value of the pushing load and the information representing to which coking chamber 11*a*, 11*b* of which coke oven 100 the measurement value belongs are inputted, the process goes to step S23. In the step S23, the graph creation portion 312 searches and reads the resistance index "k" corresponding to the measurement value of the pushing load from the resistance index storage portion 311 while using the information inputted in the step 21, representing to which coking chamber 11*a*, 11*b* of which coke oven 100 the measurement value of the pushing load belongs, as a key.

Next, in the step S24, the graph creation portion 312 judges whether an instruction to execute the creation of the graphic chart 1401 representing the relationship between the pushing load and the resistance index "k" is issued or not. As a result of this judgment, when the instruction to execute the creation of the graphic chart 1401 representing the relationship between the pushing load and the resistance index "k" is not issued, the process returns to the above-stated step S22, and judges again whether the information of the measurement value of the pushing load and so on are inputted or not.

On the other hand, when the instruction to execute the creation of the graphic chart 1401 representing the relationship between the pushing load and the resistance index "k" is issued, the process goes to step S25. In the step S25, the graph creation portion 312 judges whether the number of the resistance index "k" read in the step S23 is a threshold value or more, or not. This threshold value is the number (plural numbers) required to create the graphic chart 1401 illustrated in FIG. 19.

As a result of this judgment, when the number of the resistance index "k" read in the step S23 is not the threshold value or more, the process returns to the above-stated step S22, and judges again whether the information of the measurement value of the pushing load and so on are inputted or not.

On the other hand, when the number of the resistance index "k" read in the step S23 is the threshold value or more, the process goes to step S26. In the step S26, the graph creation portion 312 plots the position corresponding to the pushing load inputted in the step S21 and the resistance index "k" read in the step S22 as illustrated in FIG. 19, and creates the graphic chart 1401 representing the relationship between the pushing load and the resistance index "k" based on the plotted results.

Next, the graph creation portion 312 stores the graphic chart 1401 created in the step S26 into the graph storage portion 313, in step S27.

Next, an example of the repair simulation process of the coke oven wall surface repair supporting apparatus 1800 is described with reference to a flowchart in FIG. 24. This flowchart in FIG. 24 is carried out by the CPU provided at the coke oven wall surface repair supporting apparatus 1800 executing control programs stored in the ROM and the hard disk.

At first, the oven wall concave and convex information displaying portion 314 judges whether an instruction to start the execution of the repair simulation is issued or not, in step S31. As a result of this judgment, when the instruction to start the execution of the repair simulation is not issued, the flowchart in FIG. 24 is finished.

On the other hand, when the instruction to start the execution of the repair simulation is issued, the process goes to step S32. In the step S32, the oven wall concave and convex information displaying portion 314 stands by until the coke oven 100 and the coking chamber 11*a*, 11*b* being the repair objects are indicated.

When the coke oven 100 and the coking chamber 11*a*, 11*b* being the repair objects are indicated, the process goes to step S33. In the step S33, the oven wall concave and convex information displaying portion 314 reads the oven wall three-dimensional profile data 1501, 1502 for the indicated coking chamber 11*a*, 11*b* of the coke oven 100 from the oven wall three-dimensional profile data storage portion 310.

Next, the oven wall concave and convex information displaying portion 314 displays the oven wall three-dimensional profile data 1501, 1502 read in the step S33 on the display device 400, in step S34.

Next, in step S35, the repair range obtaining portion 315 stands by until the repair object regions 1503, 1504 are specified for the oven wall three-dimensional profile data 1501, 1502 displayed in the step S34.

When the repair object regions 1503, 1504 are specified for the oven wall three-dimensional profile data 1501, 1502 displayed in the step S34, the process goes to step S36. In the step S36, the repair range obtaining portion 315 obtains the repair object regions 1503, 1504. The data changing portion 316 changes the data of the concave and convex amount included in the repair object regions 1503, 1504 into, for example, "0" (zero).

Next, in step S37, the resistance index deriving process deriving the resistance index "k" for the added oven wall three-dimensional profile data in which the oven wall three-dimensional profile data of which data of the concave and convex amount is changed in the step 36 are added, is performed. This resistance index deriving process is carried out by, for example, performing the processes of the steps S53 to S63 in FIG. 22 for the added oven wall three-dimensional profile data in which the oven wall three-dimensional profile data of which data of the concave and convex amount is changed in the step S36 are added.

Next, the pushing load deriving portion 317 reads "the graphic chart 1401 representing the relationship between the pushing load and the resistance index "k"" stored in the graph storage portion 313, in step S38.

Next, in step S39, the pushing load deriving portion 317 derives the pushing load corresponding to the resistance index "k" derived in the step S37, from the graphic chart 1401 read in the step S38.

Next, in step S40, the oven wall concave and convex information displaying portion 314 displays the oven wall three-dimensional profile data of which data of the concave and convex amount is changed in the step S36, the resistance index "k" and the pushing load obtained from the oven wall three-dimensional profile data in the steps S37, S39 on the display device 400.

Next, in step S41, the oven wall concave and convex information displaying portion 314 judges whether an instruction to finish the execution of the repair simulation is issued or not. As a result of this judgment, when the instruction to finish the execution of the repair simulation is issued, the flowchart in FIG. 24 is finished.

On the other hand, when the instruction to finish the execution of the repair simulation is not issued, the process returns to the step S32, and the oven wall concave and convex information displaying portion 314 stands by until the coke oven 100 and the coking chamber 11a, 11b being the repair objects are indicated. Incidentally, when the coke oven 100 and the coking chamber 11a, 11b being the repair objects are the same as the ones specified the last time, a presence or absence of the operation representing the above is judged in the step S32, and the process goes to the step S33.

As stated above, conventionally, it is impossible to quantitatively evaluate the degree of the influence of the state of the concave and convex of the oven wall 14 exerted on the pushing load. It is because any effort to FIGURESout the influence of the local concave and convex shape of the oven wall exerted on the pushing load is not done. However, as illustrated in FIG. 19, the resistance index "k" defined by the present inventors while focusing on the local concave and convex shape has a clear correlation with the pushing load (the pushing force). Namely, it is possible to quantitatively evaluate and manage the state of the oven wall 14 affecting on the pushing load by deriving the resistance index "k", when the coking chamber 11a, 11b is diagnosed.

The graphic chart 1401 representing the relationship between the pushing load and the resistance index "k" is asked by using the pushing loads actually generated at the plural coking chambers 11a, 11b of the plural coke ovens 100 and the resistance indexes "k" derived for the coking chambers 11a, 11b. After that, the resistance index "k" when the repair object regions 1503, 1504 are repaired is calculated and the pushing load corresponding to the calculated resistance index "k" is estimated from the graphic chart 1401 when the repair object regions 1503, 1504 are specified for the oven wall three-dimensional profile data 1501, 1502. The reliability of the estimated pushing load becomes extremely high because there is the clear correlation between the resistance index "k" and the pushing load. Accordingly, it is possible for the user to easily and accurately determine the necessity of the repair, and the effective repair object regions 1503, 1504 to be repaired, based on the estimated value (the calculated value) of the pushing load. For example, it is possible to quantitatively judge which concaves and convexes are to be repaired to what degree to reduce the pushing load until a desired value within the limited repair time (the operation interruption time), when a lot of concaves and convexes exist on the oven wall 14. Accordingly, it is possible to reduce an unproductive repair than before, and to repair the oven wall 14 extremely effectively and efficiently.

Incidentally, in the present embodiment, the data changing portion 316 changes the data of the concave and convex amount included in the repair object regions 1503, 1504 into, for example "0" (zero), but it is not necessarily changed as stated above. For example, the data of the concave and convex amount may be set at a value other than "0" (zero) in accordance with a work time per one concave and convex, a degree of a desired repair, and so on. For example, it is possible to set the data of the concave and convex amount included in the repair object regions 1503, 1504 at 5 [mm] as for the convex portion, and the data of the concave and convex amount included in the repair object regions 1503, 1504 at −5 [mm] as for the concave portion. Besides, a change value (a repair value) of the data of the concave and convex amount included in the repair object regions 1503, 1504 may not be the one representing one value, but the one representing values within a predetermined range. Further, the change value (the repair value) of the data of the concave and convex amount included in the repair object regions 1503, 1504 can be made variable by enabling the user to set them.

Besides, in the present embodiment, the graphic chart 1401 representing the relationship between the pushing load and the resistance index "k" is used, but a function representing the relationship between the pushing load and the resistance index "k" may be derived to estimate the pushing load by using this function, instead of the graphic chart 1401, or in addition to the graphic chart 1401.

Besides, in the present embodiment, a case when the relationship between the pushing load and the resistance index "k" is in direct proportion (when the graphic chart 1401 is a straight line) is described as an example, but the relationship between the pushing load and the resistance index "k" may be expressed by, for example, an nth ("n" is a natural number of two or more) degree function (the graph in a curve).

Besides, in the present embodiment, the measurement value of the pushing load is inputted by the user by using the operation device 500, but it is not necessarily done as stated above. For example, the measurement values of the pushing load are stored into a removable disk while making the measurement values of the pushing loads identifiable to which coking chamber 11a, 11b of which coke oven 100 the measurement values belong, and the measurement values of the pushing loads stored in the removable disk may be read by the coke oven wall surface repair supporting apparatus 1800.

Besides, in the present embodiment, the respective oven wall three-dimensional profile data 1501, 1502 of the oven walls 14R, 14L at the right side and left side of the coking chamber 11a, 11b are displayed, and the repair object regions are specified by the user for the displayed oven wall three-dimensional profile data 1501, 1502, but it is not necessarily done as stated above. For example, image shots of the oven walls 14R, 14L at the right side and left side of the coking chamber 11a, 11b may be displayed to specify the repair object regions.

Incidentally, various modification examples described in the above-stated first embodiment can be used also in the present embodiment.

Among the embodiments described hereinabove, the parts executed by the CPU can be carried out by a computer executing programs. Besides, a unit to supply the programs to the computer, for example, a computer readable recording medium such as a CD-ROM recording such programs, or a transmission medium transmitting such programs can be applied as embodiments. Besides, a program product such as the computer readable recording medium recording the above-stated programs can also be applied as an embodiment. The above-stated programs, computer readable recording medium, transmission medium, and program product are included in a range of the present embodiment.

Besides, the above-described embodiments are to be considered in all respects as illustrative and no restrictive. Namely, the present invention may be embodied in other specific forms without departing from the spirit or essential characteristics thereof.

INDUSTRIAL APPLICABILITY

According to the present embodiments, information of a rising gradient relative to a pushing direction of coke, which is the gradient on a side wall surface of a coking chamber, is derived, and a resistance received by the coke at a pushing time is indexed by using the derived rising gradient. Accordingly, it becomes possible to quantitatively grasp a relationship between a pushing load generated at the pushing time of the coke and a state of concaves and convexes of an oven wall of the coking chamber.

Besides, according to another aspect of the present embodiments, the pushing load corresponding to the resistance index derived as for the side wall surface after a repair is derived from resistance index pushing load correlation information representing a correspondence between the resistance index and the pushing load to estimate the pushing load after the repair, by using a fact that there is the correspondence between the pushing load and the resistance index. It is possible to effectively repair the oven wall of the coking chamber of a coke oven than before by using the estimation result of the pushing load.

What is claimed is:

1. A coke oven wall surface evaluation apparatus evaluating a state of a side wall surface of a coking chamber of a coke oven operating while pushing produced coke with a pusher, the coke oven wall surface evaluation apparatus comprising:
   an imaging unit photographing the side wall surface of the coking chamber of the coke oven;
   a concave and convex information deriving unit deriving concave and convex information relating to concaves and convexes generated on the side wall surface of the coking chamber, said information being three-dimensional profile data representing concave and convex amount for each one of a plurality of regions of the side wall surface of the coking chamber, based on image signals of the side wall surface of the coking chamber photographed by the imaging unit;
   a gradient information deriving unit deriving a step of the concave and convex amount for each one of said plurality of regions adjacent to each other in a pushing direction of the coke, said step representing gradient information relating to the gradient relative to a pushing direction of the coke on the side wall surface of the coking chamber, based on the concave and convex information derived by said concave and convex information deriving unit; and
   an indexing unit deriving a resistance index in which a resistance received by the coke at a pushing time is indexed by using the gradient information derived by said gradient information deriving unit.

2. The coke oven wall surface evaluation apparatus according to claim 1, wherein said concave and convex information deriving unit derives the concave and convex information relating to the concaves and convexes by each of plural regions with a predetermined distance interval set in advance for the side wall surface of the coking chamber,
   wherein said gradient information deriving unit derives the gradient information by each of the plural regions, and
   wherein said indexing unit derives local resistance indexes in which local resistances by each of the plural regions from the rising gradient relative to the pushing direction of the coke received by the coke at the pushing time on the side wall surface of the coking chamber are indexed, and totalizes the derived local resistance indexes, to derive the resistance indexes at all over the side wall surfaces of the coking chambers.

3. The coke oven wall surface evaluation apparatus according to claim 2, wherein said concave and convex information deriving unit derives the concave and convex information by adding concave and convex amounts generated at regions facing with each other on the side wall surface at one side and the side wall surface at the other side of the coking chamber among the plural regions; and
   wherein said gradient information deriving unit derives the gradient information by using the concave and convex information added by said concave and convex information deriving unit.

4. The coke oven wall surface evaluation apparatus according to claim 3, wherein the gradient information includes information relating to a step of the concaves and convexes between the regions adjacent with each other in the pushing direction of the coke, generated on the side wall surface of the coking chamber, and
   wherein said indexing unit derives the local resistance index at the region by using a value in which the step of the concaves and convexes between the adjacent regions is exponentiated.

5. The coke oven wall surface evaluation apparatus according to claim 4, wherein the gradient information includes information relating to the step of the concaves and convexes between the regions adjacent with each other in the pushing direction of the coke, generated on the side wall surface of the coking chamber; and
   wherein said indexing unit derives the local resistance index at the region by using a value in which the local resistance index of the adjacent region is constantly multiplied.

6. The coke oven wall surface evaluation apparatus according to claim 5, wherein said indexing unit derives the local resistance index while regarding that the resistance received by the at the pushing time does not exist as for the region of which rising gradient relative to the pushing direction of the coke is not more than a threshold value among the plural regions.

7. The coke oven wall surface evaluation apparatus according to claim 6, wherein said indexing unit derives the local resistance index by performing a weighting depending on a position of the region in a depth direction of the coking chamber.

8. The coke oven wall surface evaluation apparatus according to claim 6, wherein said indexing unit derives the local resistance index by performing a weighting depending on a position of the region in a height direction of the side wall surface of the coking chamber.

9. A coke oven wall surface repair supporting apparatus of which coke oven operates while pushing produced coke with a pusher, comprising:
   an imaging unit photographing a side wall surface of a coking chamber;
   a concave and convex information deriving unit deriving concave and convex information relating to concaves and convexes generated on a side wall surface of a coking chamber, said information being three-dimensional profile data representing concave and convex amount for each one of a plurality of regions of the side wall surface of the coking chamber, based on image signals of the side wall surface of the coking chamber photographed by the imaging unit;

a concave and convex information changing unit changing the concave and convex information at a repair object region of the side wall surface of the coking chamber among the concave and convex information derived by said concave and convex information deriving unit into a repair value set in advance to make it new concave and convex information;

a gradient information deriving unit deriving a step of the concave and convex amount for each one of said plurality of regions adjacent to each other in a pushing direction of the coke, said step representing gradient information relating to a gradient relative to the pushing direction of the coke on the side wall surface of the coking chamber by using the concave and convex information changed by said concave and convex information changing unit;

an indexing unit deriving a resistance index in which a resistance received by the coke at a pushing time is indexed by using the gradient information derived by said gradient information deriving unit; and a pushing load deriving unit deriving a pushing load corresponding to the resistance index derived by said indexing unit from resistance index pushing load correlation information set in advance representing a correspondence between the resistance index and the pushing load of the coke.

10. The coke oven wall surface repair supporting apparatus according to claim 9, further comprising:

a pushing load measurement value obtaining unit obtaining a measurement value of the pushing load at the coking chamber being a deriving object of the resistance index;

a relationship deriving unit deriving and setting the resistance index pushing load correlation information by using plural sets of the resistance indexes and the measurement values of the pushing loads obtained by said pushing load measurement value obtaining unit; and wherein said indexing unit derives the resistance index by using the gradient information directly derived by said gradient information deriving unit based on the concave and convex information relating to the concaves and convexes generated on the side wall surface of the coking chamber derived by said concave and convex information deriving unit.

11. The coke oven wall surface repair supporting apparatus according to claim 10, further comprising:

a concave and convex information storage unit storing the concave and convex information derived by said concave and convex information deriving unit into a storage medium; and a concave and convex information displaying unit displaying the concave and convex information stored by said concave and convex information storage unit on a display device, wherein said concave and convex information storage unit changes the concave and convex information at a repair object region specified for the concave and convex information displayed by said concave and convex information displaying unit into a repair value set in advance.

12. The coke oven wall surface repair supporting apparatus according to claim 11, wherein said concave and convex information deriving unit derives the concave and convex information by each of plural regions with a predetermined distance interval set for the side wall surface of the coking chamber, wherein said gradient information deriving unit derives the gradient information by each of the plural regions; and wherein said indexing unit derives local resistance indexes in which local resistances by each of the plural regions from a rising gradient relative to the pushing direction of the coke on the side wall surface of the coking chamber received by coke at a pushing time are indexed, totalizes the derived local resistance indexes, to derive the resistance indexes at allover the side wall surfaces of the coking chamber.

13. The coke oven wall surface repair supporting apparatus according to claim 12, wherein said concave and convex information deriving unit derives the concave and convex information by adding concave and convex amounts generated at regions facing with each other on the side wall surface at one side and the side wall surface at the other side of the coking chamber among the plural regions, wherein said concave and convex information storage unit stores the respective concave and convex information of the side wall surface at one side and the side wall surface at the other side of, the coking chamber derived by said concave and information deriving unit into a storage medium; and wherein said gradient information deriving unit derives the gradient information by using the concave and convex information added by said concave and convex information deriving unit.

14. The coke oven wall surface repair supporting apparatus according to claim 13, wherein the gradient information includes information relating to a step of the concaves and convexes between the regions adjacent with each other in the pushing direction of the coke, generated on the side wall surface of the coking chamber; and wherein said indexing unit derives the local resistance index by using a value in which the step of the concaves and convexes between the adjacent regions is exponentiated.

15. The coke oven wall surface repair supporting apparatus according to claim 14, wherein the gradient information includes information relating to the step of the concaves and convexes between the regions adjacent with each other in the pushing direction of the coke, generated on the side wall surface of the coking chamber; and wherein said indexing unit derives the local resistance index by using a value in which the local resistance index at the adjacent region is constantly multiplied.

16. The coke oven wall surface repair supporting apparatus according to claim 15, wherein said indexing unit derives the local resistance index while regarding that the resistance received by the coke at the pushing time does not exist as for the region of which rising gradient relative to the pushing direction of the coke is not more than a threshold value among the plural regions.

17. The coke oven wall surface repair supporting apparatus according to claim 16, wherein said indexing unit derives the local resistance index by performing a weighting depending on a position of the region in a depth direction of the coking chamber.

18. The coke oven wall surface repair supporting apparatus according to claim 16, wherein said indexing unit derives the local resistance index by performing a weighting depending on a position of the region in a height direction of the side wall surface of the coking chamber.

19. A coke oven wall surface evaluation method evaluating a state of a side wall surface of a coking chamber of a coke oven operating while pushing produced coke with a pusher, the coke oven wall surface evaluation method comprising:
- photographing the side wall surface of the coking chamber of the coke oven by an imaging unit;
- performing a concave and convex information derivation deriving concave and convex information relating to concaves and convexes generated on the side wall surface of the coking chamber, said information being three-dimensional profile data representing concave and convex amount for each one of a plurality of regions of the side wall surface of the coking chamber, based on image signals of the side wall surface of the coking chamber photographed by the imaging unit;
- performing a gradient information derivation deriving a step of the concave and convex amount for each one of said plurality of regions adjacent to each other in a pushing direction of the coke, said step representing gradient information relating to a gradient relative to the pushing direction of the coke on the side wall surface of the coking chamber, based on the concave and convex information derived by said performing the concave and convex information derivation; and
- performing an indexing deriving a resistance index in which a resistance received by the coke at a pushing time is indexed by using the gradient information derived by said performing the gradient information derivation.

20. The coke oven wall surface evaluation method according to claim 19, wherein said performing the concave and convex information derivation derives the concave and convex information relating to the concaves and convexes by each of plural regions with a predetermined distance interval set in advance for the side wall surface of the coking chamber,
- wherein said performing the gradient information derivation derives the gradient information by each of the plural regions; and
- wherein said performing the indexing derives local resistance indexes in which local resistances by each of the plural regions from the rising gradient relative to the pushing direction of the coke received by the coke at the pushing time on the side wall surface of the coking chamber are indexed, and totalizes the derived local resistance indexes, to derive the resistance indexes at allover the side wall surfaces of the coking chambers.

21. The coke oven wall surface evaluation method according to claim 20, wherein said performing the concave and convex information derivation derives the concave and convex information by adding concave and convex amounts generated at regions facing with each other on the side wall surface at one side and the side wall surface at the other side of the coking chamber among the plural regions; and
- wherein said performing the gradient information derivation derives the gradient information by using the concave and convex information added by said performing the concave and convex information derivation.

22. The coke oven wall surface evaluation method according to claim 21, wherein the gradient information includes information relating to a step of the concaves and convexes between the regions adjacent with each other in the pushing direction of the coke, generated on the side wall surface of the coking chamber; and
- wherein said performing the indexing derives the local resistance index at the region by using a value in which the step of the concaves and convexes between the adjacent regions is exponentiated.

23. The coke oven wall surface evaluation method according to claim 22, wherein the gradient information includes information relating to the step of the concaves and convexes between the regions adjacent with each other in the pushing direction of the coke, generated on the side wall surface of the coking chamber; and
- wherein said performing the indexing derives the local resistance index at the region by using a value in which the local resistance index at the adjacent region is constantly multiplied.

24. The coke oven wall surface evaluation method according to claim 23, wherein said performing the indexing derives the local resistance index while regarding that the resistance received by the coke at the pushing time does not exist as for the region of which rising gradient relative to the pushing direction of the coke is not more than a threshold value among the plural regions.

25. The coke oven wall surface evaluation method according to claim 24, wherein said performing the indexing derives the local resistance index by performing a weighting depending on a position of the region in a height direction of the side wall surface of the coking chamber.

26. The coke oven wall surface evaluation method according to claim 24, wherein said performing the indexing derives the local resistance index by performing a weighting depending on a position of the region in a height direction of the side wall surface of the cooking chamber.

27. A coke oven wall surface repair supporting method of which coke oven operates while pushing produced coke with a pusher, comprising:
- photographing a side wall surface of a coking chamber by an imaging unit;
- performing a concave and convex information derivation deriving concave and convex information relating to concaves and convexes generated on a side wall surface of a coking chamber, said information being three-dimensional profile data representing concave and convex amount for each one of a plurality of regions of the side wall surface of the coking chamber, based on image signals of the side wall surface of the coking chamber photographed by the imaging unit;
- performing a concave and convex information change changing the concave and convex information at a repair object region of the side wall surface of the coking chamber among the concave and convex information derived by said performing the concave and convex information derivation into a repair value set in advance to make it new concave and convex information;
- performing a gradient information derivation deriving a step of the concave and convex amount for each one of said plurality of regions adjacent to each other in a pushing direction of the coke, said step representing gradient information relating to a gradient relative to the pushing direction of the coke on the side wall surface of the coking chamber by using the concave and convex information changed by said performing the concave and convex information change,
- performing an indexing deriving a resistance index in which a resistance received by the coke at a pushing time is indexed by using the gradient information derived by said performing the gradient information derivation; and
- performing a pushing load derivation deriving a pushing load corresponding to the resistance index derived by said performing the indexing from resistance index pushing load correlation information set in advance representing a correspondence between the resistance index and the pushing load of the coke.

28. The coke oven wall surface repair supporting method according to claim 27, further comprising:
performing a pushing load measurement value obtainment obtaining a measurement value of the pushing load at the coking chamber being a deriving object of the resistance index;
performing a relationship derivation deriving and setting the resistance index pushing load correlation information by using plural sets of the resistance indexes derived by said performing the indexing and the measurement values of the pushing loads obtained by said performing the pushing load measurement value obtainment; and
wherein said performing the indexing derives the resistance index by using the gradient information directly derived by said performing the gradient information derivation based on the concave and convex information relating to the concaves and convexes generated on the side wall surface of the coking chamber derived by said performing the concave and convex information derivation.

29. The coke oven wall surface repair supporting method according to claim 28, further comprising:
performing a concave and convex information storage storing the concave and convex information derived by said performing the concave and convex information derivation into a storage medium; and
performing a concave and convex information storage storing the concave and convex information derived by said performing the concave and convex information derivation into a storage medium; and
performing a concave and convex information display displaying the concave and convex information stored by said performing the concave and convex information storage on a display device,
wherein said performing the concave and convex information storage changes the concave and convex information at a repair object region specified for the concave and convex information displayed by said performing the concave and convex information display into a repair value set in advance.

30. The coke oven wall surface repair supporting method according to claim 29, wherein said performing the concave and convex information derivation derives the concave and convex information by of plural regions with a predetermined distance interval set for the side wall surface of the coking chamber,
wherein said performing the gradient information derivation derives the gradient information by each of the plural regions; and
wherein said performing the indexing derives local resistance indexes in which local resistances by each of the plural regions from a rising gradient relative to the pushing direction of the coke on the side wall surface of the coking chamber received by the coke at a pushing time are indexed, totalizes the derived local resistance indexes, to derive the resistance indexes at all over the side wall surfaces of the coking chamber.

31. The coke oven wall surface repair supporting method according to claim 30, wherein said performing the concave and convex information derivation derives the concave and convex information by adding concave and convex amounts generated at regions facing with each other on the side wall surface at one side and the side wall surface at one side and the side wall surface at the other side of the coking chamber among the plural regions,
wherein said performing the concave and convex information storage stores the respective concave and convex information of the side wall surface at one side and the side wall surface at the other side of the coking chamber derived by said performing the concave and convex information derivation into a storage medium; and
wherein said performing the gradient information derivation derives the gradient information by using the concave and convex information added by said performing the concave and convex information derivation.

32. The coke oven wall surface repair supporting method according to claim 31, wherein the gradient information includes information relating to the step of the concaves and convexes between the regions adjacent with each other in the pushing direction of the coke, generated on the side wall surface of the coking chamber; and
wherein said performing the indexing derives the local resistance index by using a value in which the step of the concaves and convexes between the adjacent regions is exponentiated.

33. The coke oven wall surface repair supporting method according to claim 32, wherein the gradient information includes information relating to the step of the concaves and convexes between the regions adjacent with each other in the pushing direction of the coke, generated on the side wall surface of the coking chamber; and
wherein said performing the indexing derives the local resistance index by using a value in which the local resistance index at the adjacent region is constantly multiplied.

34. The coke oven wall surface repair supporting method according to claim 33, wherein said performing the indexing derives the local resistance index while regarding that the resistance received by the coke at the pushing time does not exist as for the region of which rising gradient relative to the pushing direction of the coke is not more than a threshold value among the plural regions.

35. The coke oven wall surface repair supporting method according to claim 34, wherein said performing the indexing derives the local resistance index by performing a weighting depending on a position of the region in a depth direction of the coking chamber.

36. The coke oven wall surface repair supporting method according to claim 34, wherein said performing the indexing derives the local resistance index by performing a weighting depending on a position of the region in a height direction of the side wall surface of the coking chamber.

37. A computer-readable recording medium which stores a program for causing a computer to execute processes to evaluate a state of a side wall surface of a coking chamber of a coke oven operating while pushing produced coke with a pusher, the program product comprising:
performing a concave and convex information derivation deriving concave and convex information relating to concaves and convexes generated on the side wall surface of the coking chamber, said information being three-dimensional profile data representing concave and convex amount for each one of a plurality of regions of the side wall surface of the coking chamber, based on image signals of the side wall surface of the coking chamber photographed by a imaging unit;
performing a gradient information derivation deriving a step of the concave and convex amount for each one of said plurality of regions adjacent to each other in a pushing direction of the coke, said step representing gradient information relating to a gradient relative to the pushing direction of the coke on the side wall surface of the coking chamber, based on the concave and convex information derived by said performing the concave and convex information derivation; and performing an indexing deriving a resistance index in which a resistance received by the coke at a pushing time is indexed by using the gradient information derived by said performing the gradient information derivation.

38. A computer-readable recording medium which stores a program for causing a computer to execute processes to support a repair of a wall surface of a coke oven operating while pushing produced coke with a pusher, the program product comprising:

performing a concave and convex information derivation deriving concave and convex information relating to concaves and convexes generated on a side wall of a coking chamber, said information being three-dimensional profile data representing concave and convex amount for each one of a plurality of regions of the side wall surface of the coking chamber, based on image signals of the side wall surface of the cooking chamber photographed by a imaging unit;

performing a concave and convex information change changing the concave and convex information at a repair object region of the side wall surface of the coking chamber among the concave and convex information derived by said performing the concave and convex information derivation into a repair value set in advance to make it new concave and convex information;

performing a gradient information derivation deriving a step of the concave and convex amount for each one of said plurality of regions adjacent to each other in a pushing direction of the coke, said step representing gradient information relating to a gradient relative to the pushing direction of the coke surface on the side wall surface of the coking chamber by using the concave and convex information changed by using said performing the concave and convex information change;

performing an indexing deriving a resistance index in which a resistance received by the coke at the pushing time is indexed by using the gradient information derived by said performing the gradient information derivation; and performing a pushing load derivation deriving a pushing load corresponding to the resistance index derived by said performing the indexing from resistance index pushing load correlation information set the in advance resistance representing a index and the correspondence between pushing load of the coke.

* * * * *

UNITED STATES PATENT AND TRADEMARK OFFICE
CERTIFICATE OF CORRECTION

PATENT NO. : 8,311,777 B2
APPLICATION NO. : 12/448834
DATED : November 13, 2012
INVENTOR(S) : Masato Sugiura et al.

It is certified that error appears in the above-identified patent and that said Letters Patent is hereby corrected as shown below:

In the Specifications

Column 8, line 10, change "16a to 16C" to -- 16a to 16c --;

Column 8, line 17, change "to pushe" to -- to push --;

Column 15, line 41, change "$k_{i,j} = \left(1 + \frac{\varepsilon + d}{D_0}\right) \times \left\{1 + \frac{\gamma(H_0 - h)}{H_0}\right\} \times (\Delta Z)^\alpha + \beta \times k_{i-1,j}$" to -- $k_{i,j} = \left(1 + \frac{\varepsilon \times d}{D_0}\right) \times \left\{1 + \frac{\gamma(H_0 - h)}{H_0}\right\} \times (\Delta Z)^\alpha + \beta \times k_{i-1,j}$ --;

Column 16, line 11, change "index $k_{i,j}$" to -- index $k_{i-1,j}$ --;

Column 16, line 27, change ""ϵ"" to -- "ε" --;

Column 16, line 30, change "(1 + (ϵ×d)/D$_0$" to -- (1 + (ε×d)/D$_0$ --;

Column 16, line 38, change ""ϵ"" to -- "ε" --;

Column 16, line 42, change ""ϵ"" to -- "ε" --;

Column 16, line 48, change ""ϵ"" to -- "ε" --;

Column 16, line 60, change ""ϵ" is defined so that the weighting coefficient "ϵ"" to -- "ε" is defined so that the weighting coefficient "ε" --;

Column 17, line 10, change ""ϵ"" to -- "ε" --;

Column 17, line 17, change ""ϵ", "β", "ϵ"," to -- "ε", "β", "ε", --;

Column 17, line 21, change ""ϵ"" to -- "ε" --;

Column 17, line 24, change ""ϵ"" to -- "ε" --;

Column 17, line 30, change "k $_{i-1,j}$" to -- k $_{i,j}$ --; (first occurrence)

Column 17, line 50, change ""ϵ"" to -- "ε" --;

Column 18, line 2, change "(1, 1), (p, 1), (2, 1), (p, q)" to -- (1, 1), ..., (p, 1), (2, 1), ..., (p, q) --;

Signed and Sealed this
Twenty-fourth Day of December, 2013

Margaret A. Focarino
*Commissioner for Patents of the United States Patent and Trademark Office*

CERTIFICATE OF CORRECTION (continued)
U.S. Pat. No. 8,311,777 B2

Column 20, line 64, change "$k_{i,j}$" to -- $k_{i-1,j}$ --;

Column 20, line 67, change ""$\epsilon$"" to -- "$\varepsilon$" --;

Column 21, line 13, change ""$\epsilon$"" to -- "$\varepsilon$" --;

Column 23, line 34, change ""$\epsilon$"" to -- "$\varepsilon$" --;

Column 24, line 45, change ""$\epsilon$"" to -- "$\varepsilon$" --;

Column 30, line 46, change ""$\epsilon$"" to -- "$\varepsilon$" --;

Column 30, line 53, change ""$\epsilon$"" to -- "$\varepsilon$" --;

Column 33, line 31, change "FIGURESout" to -- figure out --;

In the Claims

Column 39, line 46, change "allover the side" to -- all over the side --;

Column 42, line 60, change "a imaging unit" to -- an imaging unit --;

Column 44, line 22, change "a index" to -- an index --.